United States Patent
Moore et al.

(10) Patent No.: US 6,938,148 B2
(45) Date of Patent: Aug. 30, 2005

(54) MANAGING LOAD AND STORE OPERATIONS USING A STORAGE MANAGEMENT UNIT WITH DATA FLOW ARCHITECTURE

(75) Inventors: Charles Roberts Moore, Austin, TX (US); Ravi Nair, Briarcliff Manor, NY (US); Wolfram M. Sauer, Nufringen (DE)

(73) Assignee: International Business Machines Corporation, Armonk, NY (US)

( * ) Notice: Subject to any disclaimer, the term of this patent is extended or adjusted under 35 U.S.C. 154(b) by 755 days.

(21) Appl. No.: 09/737,342

(22) Filed: Dec. 15, 2000

(65) Prior Publication Data

US 2004/0073775 A1 Apr. 15, 2004

(51) Int. Cl.[7] ............................................. G06F 15/00
(52) U.S. Cl. ...................................................... 712/216
(58) Field of Search ................................ 712/203, 204, 712/216

(56) References Cited

U.S. PATENT DOCUMENTS

| | | | | |
|---|---|---|---|---|
| 5,539,892 A | * | 7/1996 | Reininger et al. | 711/207 |
| 5,761,712 A | * | 6/1998 | Tran et al. | 711/126 |
| 5,764,946 A | * | 6/1998 | Tran et al. | 712/239 |
| 5,765,035 A | * | 6/1998 | Tran | 712/216 |
| 5,802,588 A | * | 9/1998 | Ramagopal et al. | 711/156 |
| 5,835,962 A | * | 11/1998 | Chang et al. | 711/206 |
| 5,848,287 A | * | 12/1998 | Tran et al. | 712/23 |
| 6,009,516 A | * | 12/1999 | Steiss et al. | 712/244 |
| 6,473,832 B1 | * | 10/2002 | Ramagopal et al. | 711/118 |

OTHER PUBLICATIONS

InstantWeb. "Online Computing Dictionary." Search terms: cache and register http://www.instantweb.com/foldoc.cgi?computer+dictionary.*

Rosenberg, Jerry M. "Dictionary of Computers, Information Processing & Telecommunications". Second Edition. New York: John Wiley & Sons, ©1987. p. 370.*

Short, Kenneth L. "Microprocessors and Programmed Logic". Englewood Cliffs, NJ: Prentice–Hall, Inc., ©1981. pp. 12–13 and 72–76.*

Diefendorff, Keith. "PC Processor Microarchitecture," *Microprocessor Report*, vol. 13, No. 9; via Internet at http://www.chipanalyst.com/x86/microarchitecture/index.html, pp. 1–16.

Brehob et al. "Beyond RISC–The Post–RISC Architecture," *IEEE Micro*, Mar. 1996, via Internet at http://www.cs.msu.edu/~crs/cps920/, pp. 1–19.

Gerritsen, Armin. "Out of Order Execution," via Internet at http://cpusite.examedia.nl/docs/ooo.html, pp. 1–8.

Silc et al. "Asynchrony in Parallel Computing: From Dataflow to Multithreading," *Parallel and Distributed Computing Practices*, vol. 1, No. 1, Mar. 1998; via Internet at http://www–csd.ijs.si/silc/pdcp.html, pp. 1–39.

* cited by examiner

*Primary Examiner*—Eddie Chan
*Assistant Examiner*—Aimee J. Li
(74) *Attorney, Agent, or Firm*—Richard F. Frankeny; Winstead Sechrest & Minick P.C.; Casimer K. Salys

(57) ABSTRACT

A Storage Reference Buffer (SRB) designed as an autonomous unit for all Store operations that transfer data from the execution unit of a processor to the memory hierarchy and Load operations that transfer data from the memory hierarchy to the execution unit of the processor. The SRB partitions up the Load and Store operations into several smaller operations in order to perform them in parallel with other Load and Store requests. System elements are included to determine unambiguously which of these Load and Store operations may be performed without waiting for prior operations to be completed. The SRB also includes system elements to detect whether requests may be satisfied by existing entries in the SRB without having to access the cache. The SRB is operated as a content addressable memory. Load request are simultaneously launched to cache and to the SRB with the Cache request being canceled if the Load request may be satisfied by an SRB entry.

55 Claims, 14 Drawing Sheets

State transition diagram for load operations

State transition diagram for store operations

MANAGING LOAD AND STORE OPERATIONS USING A STORAGE MANAGEMENT UNIT WITH DATA FLOW ARCHITECTURE

TECHNICAL FIELD

The present invention relates in general to managing Loads and Stores using a data flow architecture for an out-of-order instruction processor.

BACKGROUND INFORMATION

The management of storage accesses in an out-of-order execution processor is a complex problem. Traditional techniques rely on a number of discrete and distributed controllers to manage the relationship between the program ordered Loads and Stores. While these techniques achieve the required functionality, they present wiring and cycle time difficulties because of the global wiring necessary and the difficulty in keeping all execution units busy. Throughout this disclosure Load and Store operations may be referred to as Load and Store instructions or simply Loads and Stores.

There is a need, therefore, to incorporate all the functionality needed to manage out-of-order execution Loads and Stores into a single structure that uses an architecture where control is embedded into the data used to manage Loads and Stores. This type of architecture is sometimes termed a data-flow architecture as opposed to a control flow architecture.

SUMMARY OF THE INVENTION

A Storage Management Unit (SMU) comprises a Storage Reference Buffer (SRB) and Data Cache memory (D-Cache). The SRB comprises a set of contiguous registers accessed by the use of address pointers (pointers). The pointer operation is such that the SRB operates as a circular buffer where the content of pointers roll over from a maximum back to the minimum and vice versa depending on the indexing of the pointer. Register entries into the SRB are partitioned into data entry fields. These fields have data in the form of real addresses and quadwords stored in memory space at these addresses as well as control information that determines what operations are applied to the data. The SRB is content addressed in that entries are tracked based on the real address data contained in a field of the entry. The SRB is used to manage Load and Store operations within the system. When the SMU receives a request for access to a real address, the real addresses is sent to D-Cache as well as to the SRB which acts as a small level zero (L0) cache ahead of the level one (L1) D-Cache. If the requested real address is found in the SRB and the control information indicates it is valid, the request to the D-Cache may be canceled, speeding up Load and Store operations. The SRB operates as a data flow architecture in that the control information associated with a particular real address is contained in the entry that also contains the real address. Several pointers are defined for the SRB indicating registers next in line to receive an entry, remove an entry and defining windows or groups of registers in which a particular entry may be used for a current Load or Store operation. Operations on data entry fields of a SRB entry are processed using pipeline execution units. Data entry fields are scanned to determine content matches and operations are performed on selected data entry fields based on decode of other data entry fields and availability of processing resources.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
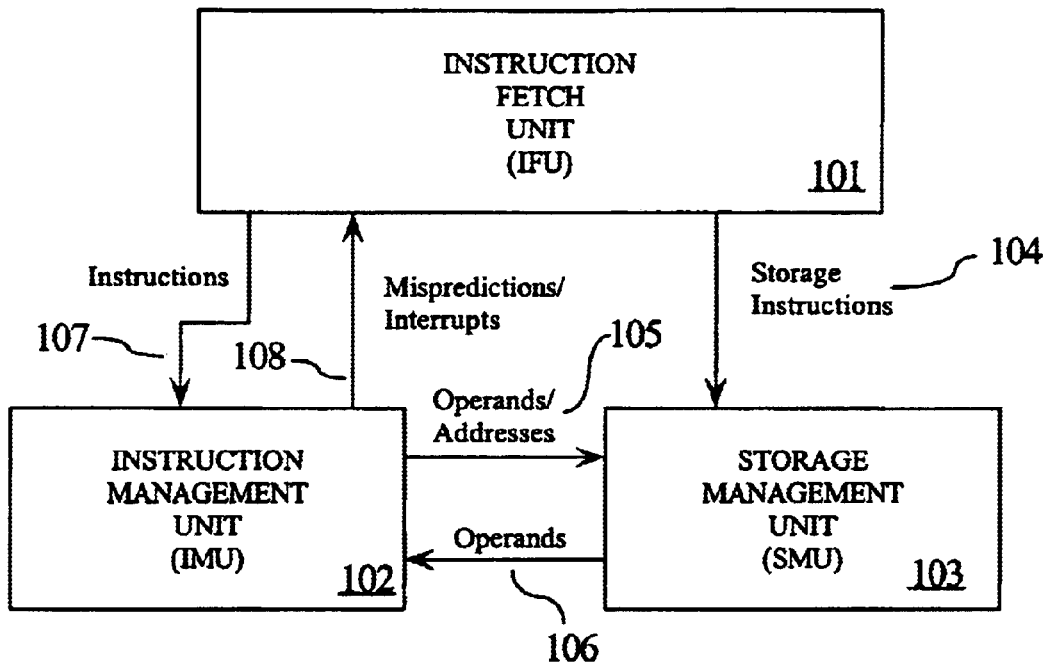
FIG. 1 is a block diagram of the connections between the Instruction Fetch Unit (IFU), the Instruction Management Unit (IMU) and the Storage Management Unit (SMU) which contains the SRB.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of the units that primarily interact with the SMU 103, which contains the SRB 212 (see FIG. 2) according to embodiments of the present invention. IFU 101 fetches or retrieves instructions from Instruction Cache (I-Cache) 210 (see FIG. 2). Storage instructions 104 may be sent directly toSMU 103. Other instructions 107 are sent through IMU 102. IMU 102 generates Operands/Addresses 105 which are sent to SMU 103 and receives Operands 106 back from SMU 103. Mispredictions and interrupts 108 are sent back to IFU 101.

Figure 2:
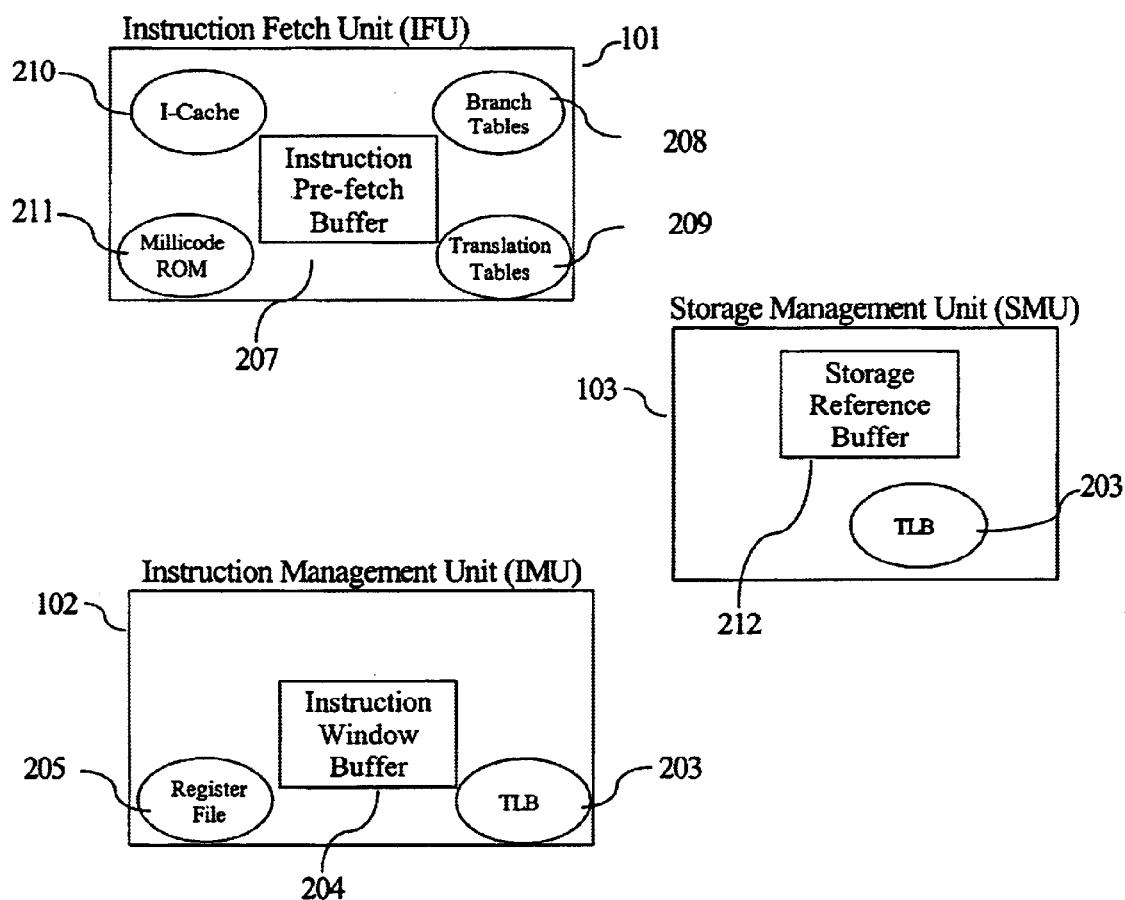
FIG. 2 is a block diagram of details of the IFU, IMU and the SMU.

FIG. 2 is a block diagram of details of IFU 101, IMU 102 and SMU 103. IFU 101 comprises an Instruction Ne-fetch Buffer 207, I-Cache 210, Millicode Read Only Memory (ROM) 211, Translation Tables 209 and Branch Tables 208. IMU 102 comprises Instruction Window Buffer (IWB) 204, Register File 205, and Translation Look-up Buffer (TLB) 223. SMU 103 comprises SRB 212 and TLB 203. SRB 212 is the unit that comprises embodiments of the present invention. Although all of the preceding units are used with embodiments of the present invention, the detailed operations of all the units are not necessary to explain the present invention. Only details of the necessary units will be explained in the following description.

Figure 3:
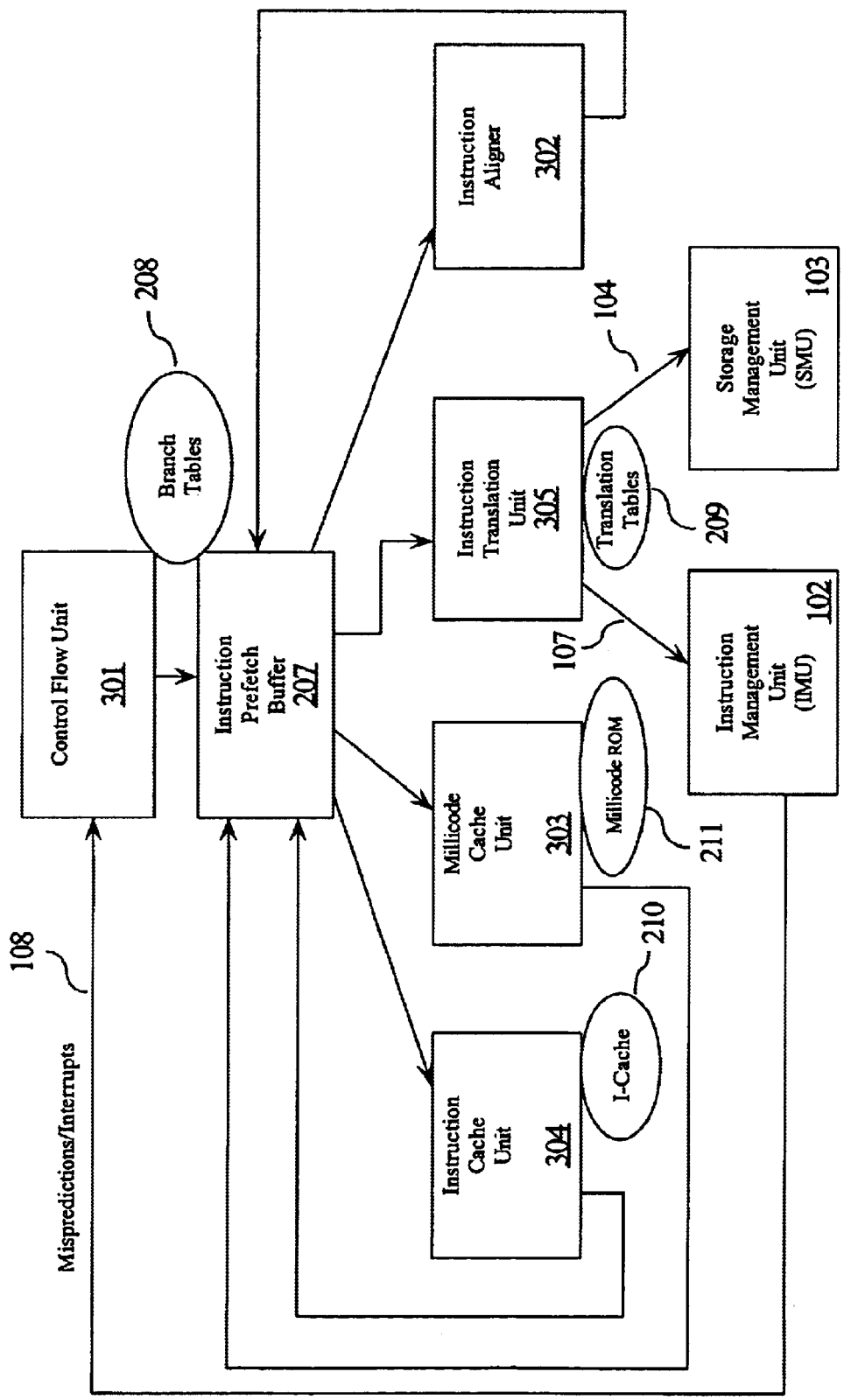
FIG. 3 is a block diagram detailing interconnections of the IFU, IMU and the SMU and the units that make up the IFU.

FIG. 3 is a block diagram of details of IFU 101 illustrating additional units and the unit interconnections. IFU 101 comprises Control Flow Unit (CFU) 301, Instruction Cache Unit (ICU) 304, Millicode Cache Unit (MCU) 303, Instruction Translation Unit (ITU) 305 and Instruction Aligner 302. Branch Tables 208 are associated with CFU 301 and Instruction Pre-fetch Buffer 207. I-Cache 210 is associated with ICU 304 and Millicode ROM 211 is associated with MCU 303. Translation Tables 209 are associated with ITU 305. ITU 305 determines the instructions types and sends storage instructions 104 directly to SMU 103 and other instructions 107 to IMU 102. Mispredictions and interrupts 108 come from IMU 102.

Figure 4:
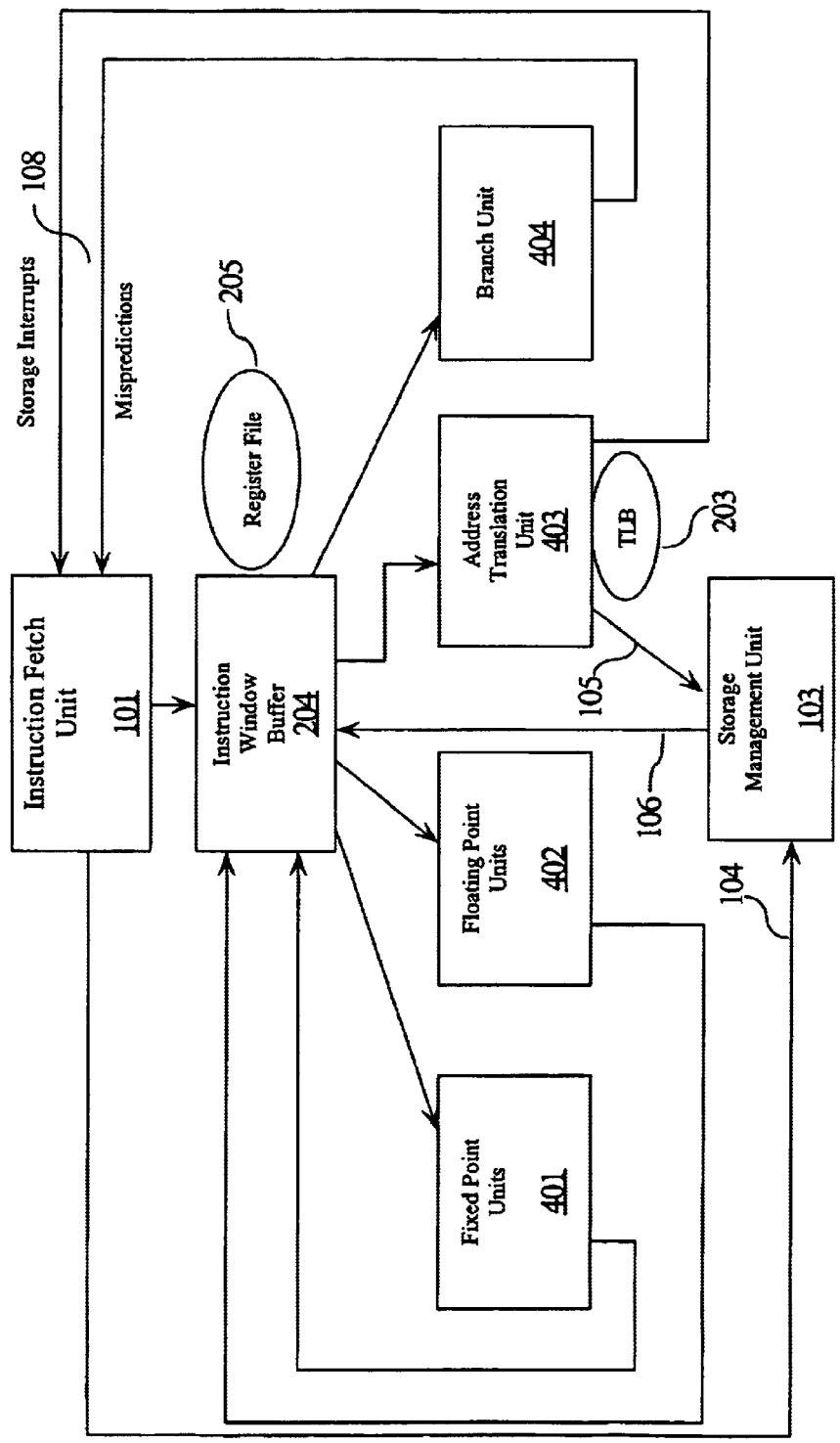
FIG. 4 is a block diagram detailing interconnections of the IFU, IMU and the SMU and the units that make up the IMU.

FIG. 4 is a block diagram of details of IMU 102 illustrating additional units in IMU 102 and the unit interconnections. IMU 102 comprises previous units, IWB 204, Register File 205, and TLB 203. Also coupled to IWB 204 are execution units; Fixed Point Units (FXU) 401, Floating Point Unit (FPU) 402 and Branch Unit 404. Address Translation Unit (ATU) 403 is associated with TLB 203 and provides address and operands via connection 105. Operands are returned to IWB 204 via 106. Storage instructions are sent to SMU 103 via 104. Mispredictions and Storage interrupts 108 are coupled to IFU 101 from ATU 403 in IMU 102.

Figure 5:
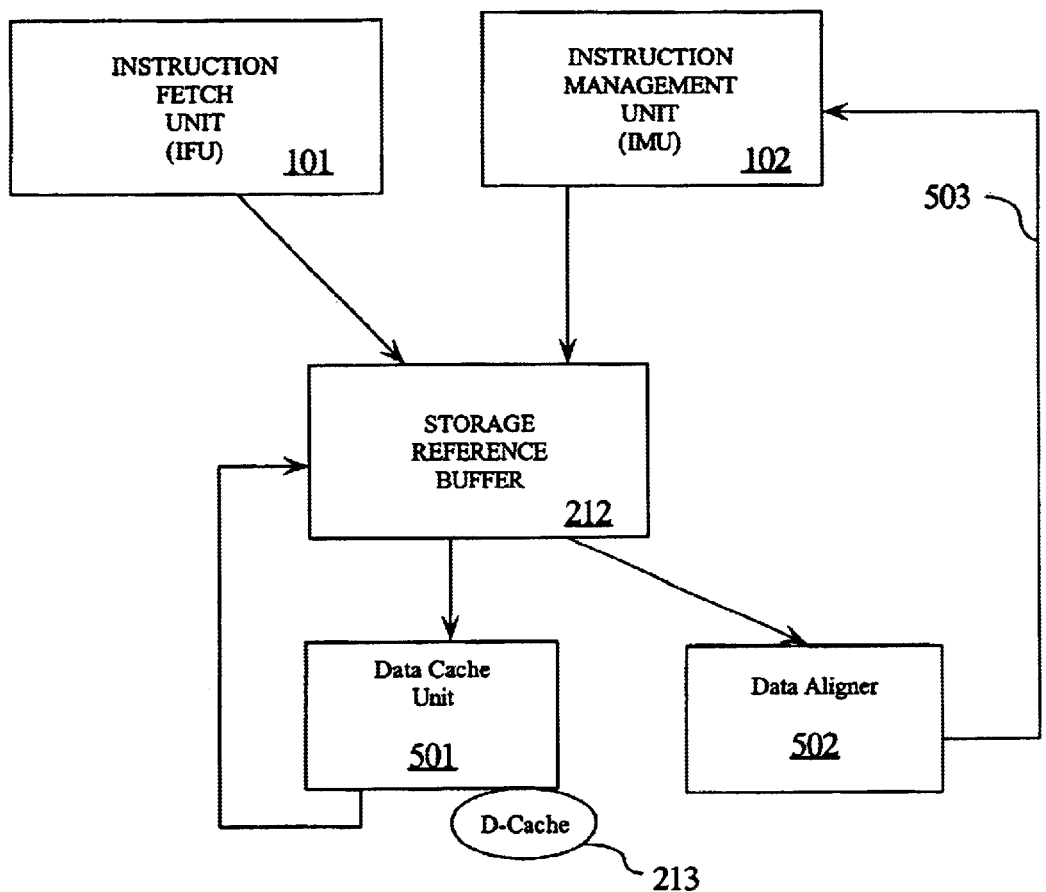
FIG. 5 is a block diagram detailing interconnections of the IFU, IMU and the SMU and the units that make up the SMU.

FIG. 5 illustrates details of SMU 103 according to embodiments of the present invention. IFU 101 and IMU 102 are coupled to SRB 212 in SMU 103. SMU 103 has additional units, Data Cache Unit (DCU) 501 and Data Aligner 502. D-Cache 213 is associated with DCU 501. Cache requests are sent to DCU 501 and Load packets are returned to SRB 212. Data Aligner 502 positions data bytes (operands) in the correct position for return to IMU 102 via connection 503.

Embodiments of the present invention disclose a new SMU 103 which is used to manage the Loads and Stores in an out-of-order execution processor where the storage unit is based on an architecture where control is embedded into the fields of the data stored in elements of the SMU 103. The control information is encoded and decoded by logic within the SMU 103.

The central part of the SMU 103 is the SRB 212. The SRB 212 acts as a multi-ported "L0 Cache" for the microprocessor allowing the L1 cache to be single ported and real addressed which reduces the complexity of the L1 cache significantly. The SRB 212 is organized as a circular buffer with a number of entries (e.g., 64 entries). A circular buffer in this context is a series of 64 register positions where the register addressing, if the maximum or minimum are exceeded, rolls over to the next lower or higher address respectively. For example, in a 64 entry circular buffer (00 to 63), if the addressing reached register 63 then the next increment in the address would return to address 00 if the addressing index was increasing. If register 00 was reached in a decreasing address index, then the address index would roll over to 63.

Figure 6:
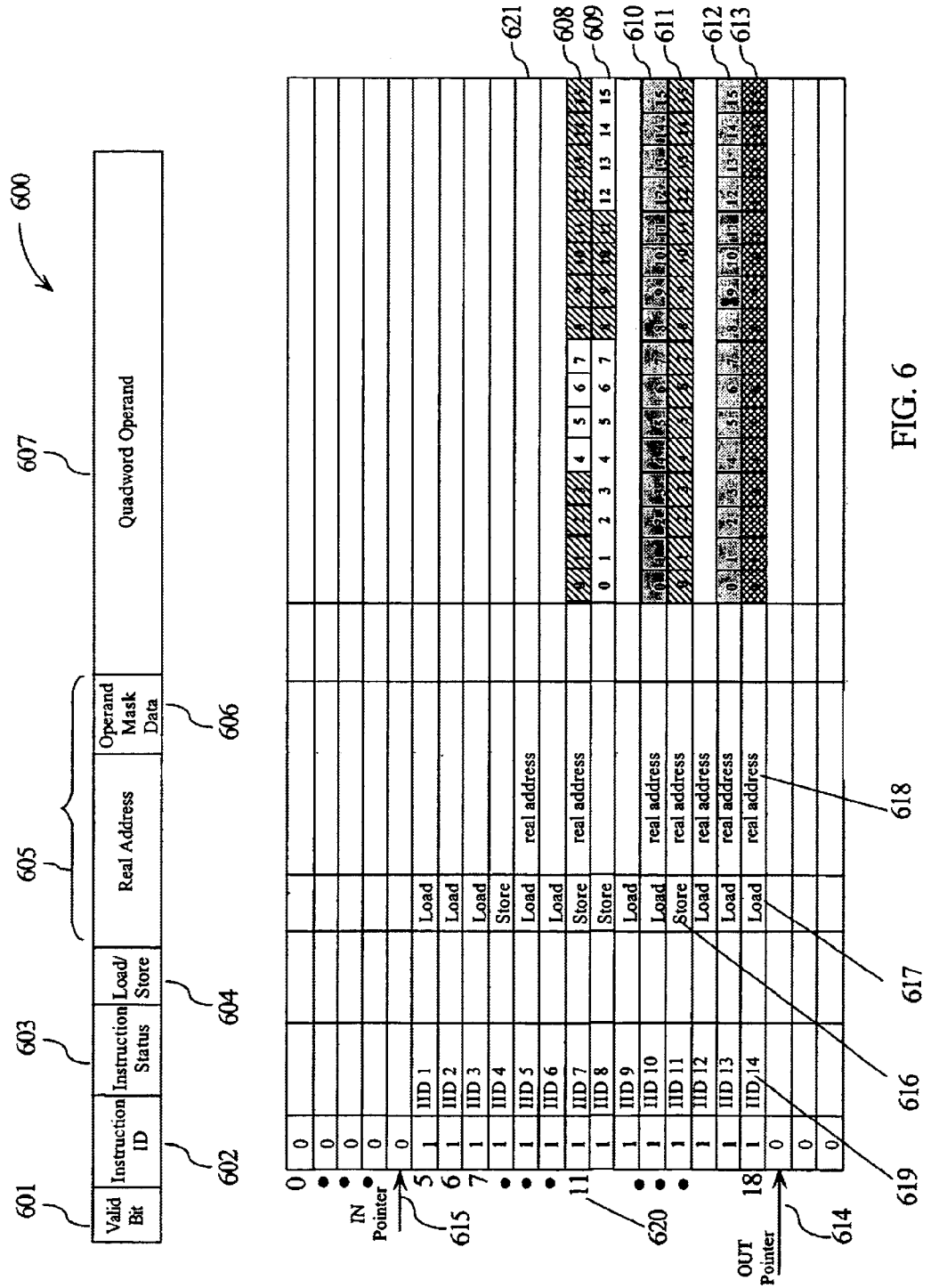
FIG. 6 is a diagram of the structure of register fields in registers of the SRB and an exemplary sequence of register entries in the SRB.

FIG. 6 is a diagram illustrating the fields of an entry in the SRB 212. Registers of the SRB 212, according to embodiments of the present invention, are addressed by the use of pointers. Pointers contain the addresses of the registers in the SRB 212. Particular pointers, for example the IN pointer 615 and the OUT pointer 614 are loaded with particular register addresses which are indexed under certain conditions. The IN pointer 615 points to the register where a register entry is next added and OUT pointer 614 points to the register where a register entry is next retired or removed. If the SRB 212 has 64 register positions (0–63), both the IN pointer 615 and the OUT pointer 614 may point to an initial register address of 63. After the first register entry, the IN pointer 615 is decremented to 62 while the OUT pointer 614 remains with pointer value 63. When another register entry is added, the IN pointer 615 is again decremented to 61 and the OUT pointer 614 remains at 63. If the first entry (which contains a Load or a Store-operation) completes, the OUT pointer is decremented to 62 and the IN pointer remains at 61. The SRB 212, in embodiments of the present invention is structured so the pointers roll over after they reach a zero to the maximum value (e.g., 63). In this manner the SRB 212 is a circular buffer.

The following details the organization of a register 600 in SRB 212. Valid bit (1 bit) 601 indicates the validity of the Quadword 607 during Loads and Stores. If an operation is a Load, the Quadword 607 becomes valid as soon as the full Quadword has been fetched. For a Store, the Quadword 607 becomes valid only if the Stored operand (1, 2, 4, or 8 bytes) becomes valid and the remaining bytes have been fetched from a valid location or from the cache. Instruction ID (6 bits) 602 is used to identify the instruction associated with a Load/Store. There may be more than one entry with the same instruction ID, as when multiple Quadwords are needed to satisfy a Load or a Store. In these cases, instructions with the same instruction ID will all be adjacent. Status (3 bits) 603 indicates the status of SRB 212 entries. Load/Store (1 bit) 604 indicates whether the operation is a Load or a Store. Real Address (64 bits) 605 refers to the Quadword real address which is needed before the D-cache 213 may be accessed. Operand Mask 606 is essentially a 16-bit field that indicates selected bytes in a Quadword. Although the Operand Mask 606 is 16 bits, not all states are valid. The operand mask is on 1, 2, 4, 8 byte boundaries. Quadword operands 607 are the 16 bytes of data accessed from a D-Cache line.

FIG. 6 also illustrates an exemplary 22 entries in the SRB 212. The entries are numbered for illustration, for example entry 620 is numbered 11. In FIG. 6, the IN pointer 615 is set to the entry position number 4 and the OUT pointer 614 is set to the entry position number 19 which defines a window of instructions. The entries 5 through 18 are the entries that are currently valid indicated by a one in the Valid bit field 601. Since the instruction IDs (IID) 602 are known and supplied when the instructions are dispatched from the IFU 101 to the SMU 103, the IID field 602 of all the entries in the "window"(defined by IN pointer 614 and OUT pointer 615) are shown with IID (e.g., IID 619). Table 1 (on pg. 21) illustrates conditions for setting status bits in the Instruction Status field 603. All the instructions in the SRB 212 must be either a Load or a Store indicated by a "Load" (i.e., 617) or a "Store" (i.e., 616) in the IID field 602 of FIG. 6. In actual practice, a logic one or zero would be used for this designation. Real addresses are generated only after the IMU 102 calculates the virtual address and the TLB 203 generates the appropriate real address (i.e., 618). Since address calculation is in a decoupled unit, the order in which real addresses are filled into the Real Address field 605 is not predictable. However, once the address does get filled in an entry, that entry is said to have its address "resolved". The Operand Mask 606 is used to determine which bytes of the Quadword operand field 607 are selected for a particular Load or Store operation. Use of the Operand Mask 606 is detailed later in the disclosure. The Quadword operands 608 through 613 are used to describe states of entries within the window defined by IN pointer 615 and OUT pointer 614. The Quadword field 607 is shown for the specific Quadwords as numbered blocks 0 through 16, where each block represents a byte of data.

Typically an SRB 212 entry starts without any operand and this case is indicated by blank Quadword operand entries (e.g., Quadword operand 621). For a Store operation, the base part of the Quadword operand must be acquired. The base part of the Quadword operand field 607 is the part that is unaffected by the Store operation. That part of the Quadword operand field 607 that is to be changed is called just the "operand". The update of these-two parts of the Quadword operand field 607 occurs independently and their order is not predictable. Quadword Operand 608 and 609 illustrate these two cases. In Quadword Operand 608, the base (bytes 0–3, and 8–15) is updated first. The "operand" part (bytes 4–7) is updated second. In Quadword Operand 609, the "operand" (bytes 8–11) is updated first and the base (bytes 0–7 and 12–15) is updated second. Eventually both parts of the Quadword Operand field 607 are updated resulting in a completed Quadword Operand (e.g., Quadword Operand 611) which is shown completely hatched. An entire Quadword operand field 607 of Quadword Operands 610 and 612 are shown shaded to indicate an entire update of the Quadword Operand for a Load operation. After the Quadword Operand field 607 is updated, the Load needs to be "issued" to transfer the appropriate part of the Quadword Operand field 607 to the IMU 102. Only after an issue takes place can the Load entry be marked as completed. The Load in entry position 18 has Quadword Operand 613 which is double cross-hatched to show an entire Quadword that has been updated but as yet has not be "issued".

Figure 9:
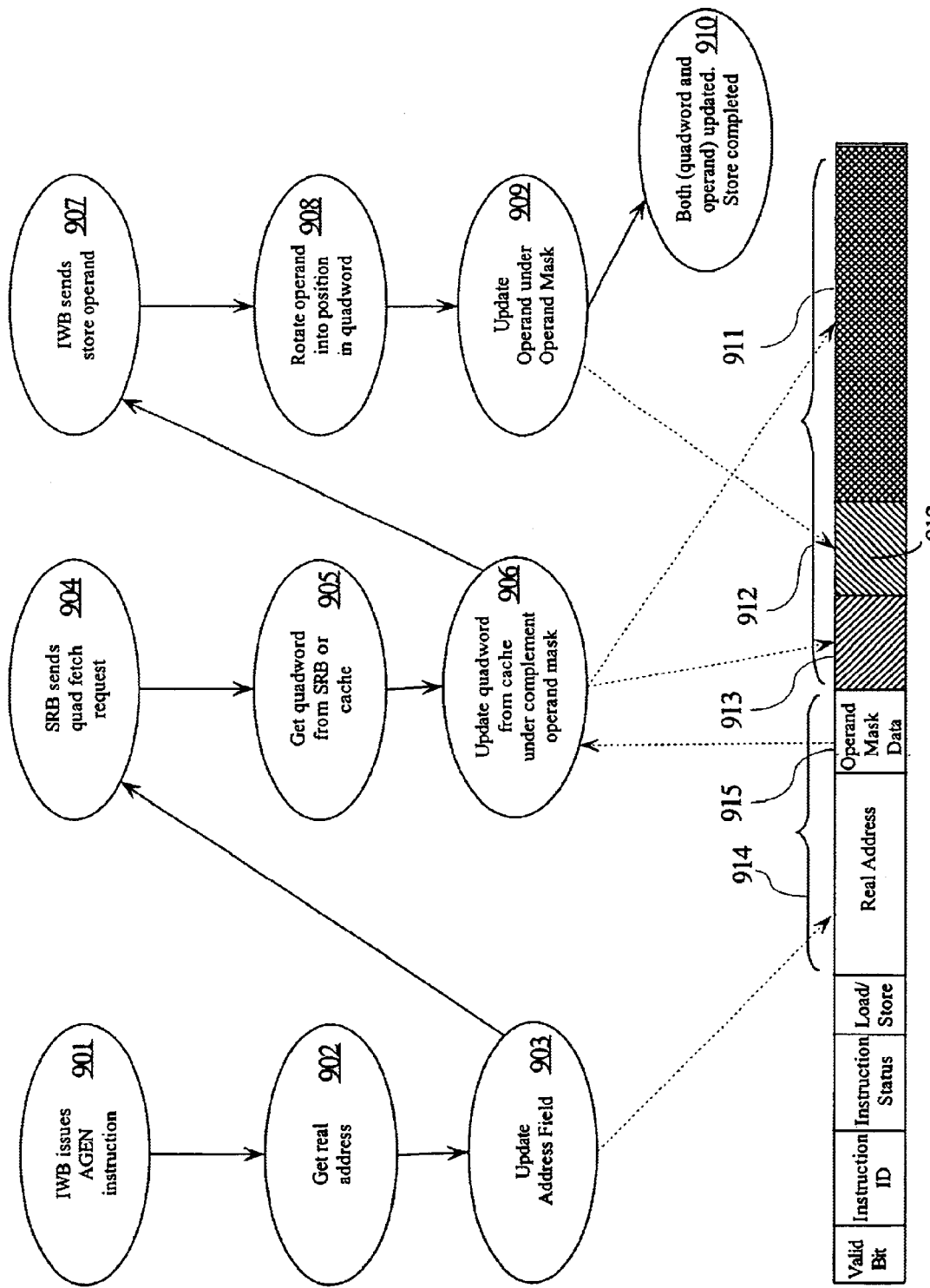
FIG. 9 is a state diagram detailing operations in filling the Real Address field in a Quadword.

FIG. 9 is a flow diagram of steps used in embodiments of the present to perform a Store operation using SRB 212. In step 901, the IWB 204 issues an address generation (AGEN) instruction to ATU 403. The real address is obtained in step 902 and in step 903 the address field is updated. This address updating step updates real address 914. In step 904, the SRB 212 issues a Quadword fetch both to itself and to the D-Cache 213. It is possible that the desired Quadword is already in the SRB 212 from a previous Load. In step 905, the Quadword is received. The Operand Mask Data 915 is derived from lower order real address bits. The operand mask indicates which bytes in the Quadword are to be Stored. The D-Cache 213 has those Quadword operands that are not to be changed and the addresses/operands 105 from the IMU 102 supplies the operands that are to be changed by the Store operation. Since it is not known whether the entry to the SRB 212 or the retrieval of the Load packet from the D-Cache 213 will occur first, overwriting the SRB 212 entry with the D-Cache 213 Quadword must be protected.

Therefore, in step 906 the Quadword under a complement operand mask (e.g., 911 and 913) is updated with the Quadword from D-Cache. In step 907, the IWB 204 sends the Store operand. In step 908, the Store operand is rotated into position in the Quadword, and in step 909 the Quadword is updated under the operand mask (e.g., 916) with the Store operand. In step 910, the entire Quadword 912 is updated with the Store operands and the Store is completed.

Figure 10:
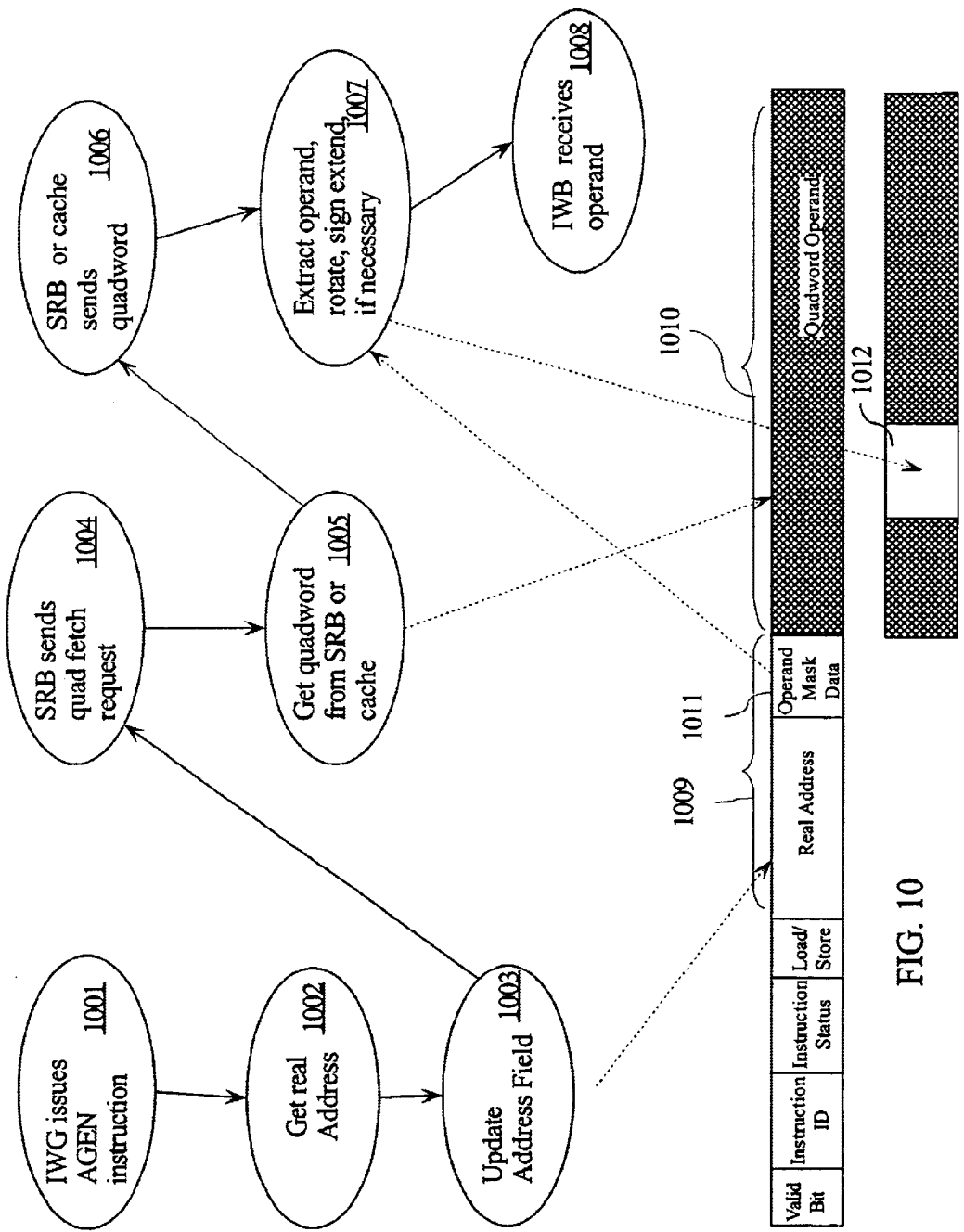
FIG. 10 is a state diagram detailing operations in filling the Quadword field in a register entry.

FIG. 10 is a flow diagram of a Load operation. In step 1001, the IWB 204 issues a AGEN instruction to the ATU 403 and the real address is generated in step 1002. In step 1003, the real address field 1009 is updated in the SRB 212. In step 1004, the SRB 212 issues a Quadword fetch to itself and D-Cache 213. In step 1005, the Quadword 1010 is received from either the SRB 212 or the D-Cache 213. In step 1006 the SRB 212 or the D-Cache 213 sends the Quadword 1010. In step 1007, the operand 1012 is extracted using the Operand Mask Data 1011 and rotated and sign extended if necessary. In step 1008, the IWB 204 receives the loaded operand 1012.

In the operation of the SRB 212 during Loads and Stores, an IN pointer (e.g., IN pointer 615) points to the entry at which the next entry will be inserted, and an OUT pointer 614 points to the next entry that will be retried. The OUT pointer 614 always points to a valid entry, except when the buffer is empty. Hence the validity of an entry must be tested before an item pointed to by the OUT pointer 614 is taken. At the beginning, the IN pointer 615 is set to register position 0, and the OUT pointer 614 is also set to register position 0. When the IN pointer 615 and OUT pointer 614 coincide and the register position pointed to by the OUT pointer 614 is valid, the buffer is considered full. No new entries are allowed until the register positions pointed to by the IN and OUT pointers become different again.

Valid entries are allocated by the Instruction Fetch Unit (IFU) 101 when Load/Store instructions are encountered. In certain designs, these entries may be allocated along with the dispatch of Load/Store entries to the IWB 204. At this time an Instruction ID field is set to the ID of the instruction as identified in the IWB 204. The address type is initially set to unresolved. At some stage the address gets resolved and a valid address is placed in the address field. All bits of the operand validity field are set to invalid. Bits in this field are set to valid as each byte within the Quadword become valid. An entry will be called valid only if all the validity bits of the entry are valid.

Figure 11:
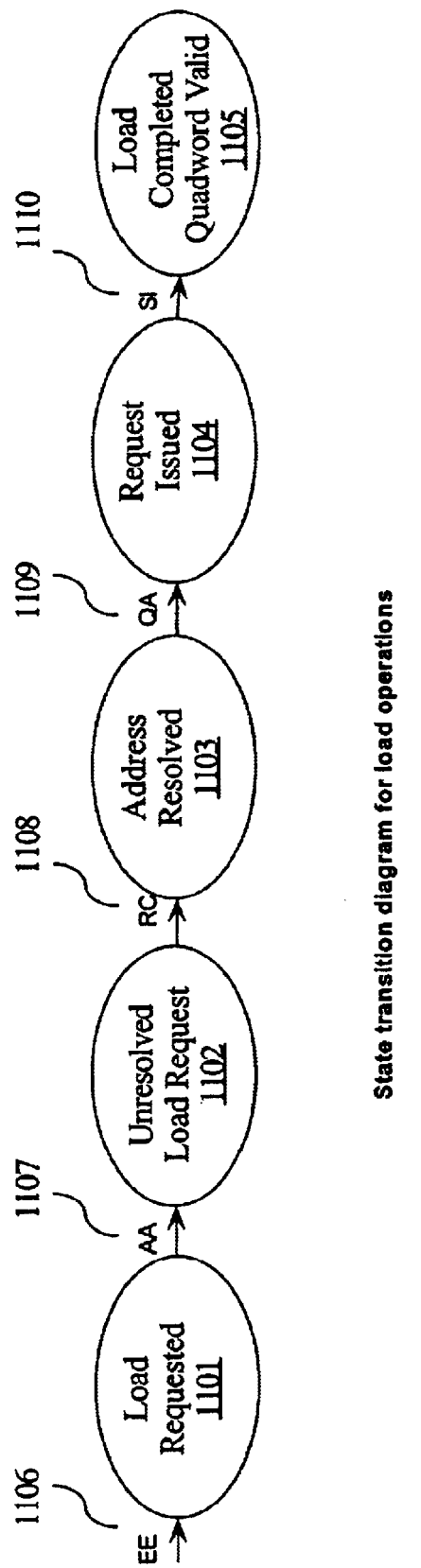
FIG. 11 is a state diagram illustrating a Load operation according to embodiments of the present invention.

FIG. 11 is a state transition diagram further explaining a Load operation according to embodiments of the present invention. There are four states that a Load operation transitions starting when it "enters" the SRB 212 until it is completed and "leaves" the SRB 212. EE 1106 indicates that the Load operation has established entry to SRB 212 by the Load Requested state 1101. After the Load Requested state 1101 a "filter", AA 1107, performs steps 1001, 1002 and 1003 of FIG. 10 and transitions to the Unresolved Load Request state 1102. Filters, according to embodiments of the present invention, are uniquely associated with each service (operations that are performed on data entry fields). All filters operate in parallel, checking to determine whether there is any entry that needs the particular service of the filter, selecting the earliest entry if there are several, and dispatching that entry to the hardware that performs the service. The filters also perform the operation of "scanning" the entry fields of the SRB 212. Scanning may be done with a multiplexer or other circuit that allows a predetermined input value (e.g., a real address) to be compared to a value in like data entry fields (e.g. Real Address fields 605) in the SRB 212 registers to determine a match. On a match, the address of the register containing the matching value is compared to the register addresses bounded by register address pointers (e.g., IN pointer 615 and OUT pointer 614). Other operations may be done on data entry fields of a register corresponding to a matching value as a result of scanning based on a decode of other data entry fields (e.g. Instruction Status field 605).

Another filter, RC 1108, performs the steps 1004 and 1005 in FIG. 10 and transitions to the Address Resolved state 1103. Filter QA 1109 performs the step 1006 and simply matches the real address of an incoming Quadword (e.g., 911) with the real address fields (e.g., 914) in SRB 212 and updates the Quadword field in the matching entries. QA 1109 causes a transition to Request Issued state 1104. SI 1110 is a filter that performs steps 1007 and 1008 and transitions to Load Completed state 1105. Many of the transitions from one state to the next are triggered by the action of these specific filters (e.g., AA 1107, RC 1108, QA 1109 and SI 1110). Each Load entry transitions through the states required for a Load operation when using the SRB 212 according to embodiments of the present invention. However, in embodiments of the present invention, the Load operations do not progress sequentially one after another through the states illustrated in FIG. 11. Rather, the filters may change the state of entries in a non-deterministic manner. This ensures that one Load operation waiting for some action does not hold up other Load operations which could potentially progress entirely through the states.

Figure 12:
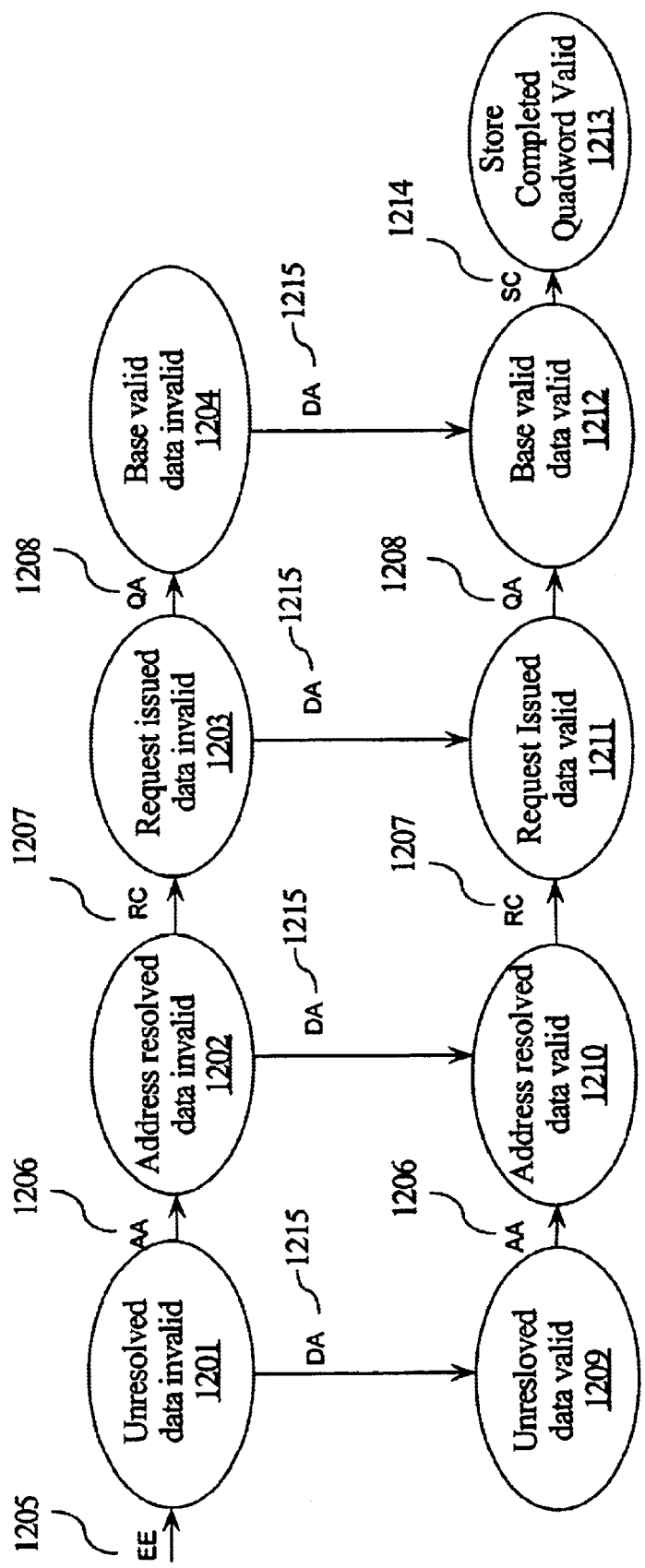
FIG. 12 is a state diagram illustrating a Store operation according to embodiments of the present invention.

FIG. 12 is a state transition diagram further explaining a Store operation according to embodiments of the present invention. The Store operation is slightly different from the Load operation because two actions have to be completed, namely those of updating the base part (that which remains unchanged) of the Quadword field and the operand or data part (that which changes) of a Quadword 912. EE 1205 indicates that the Store operation has established entry to SRB 212. The base part is updated from the cache (e.g., D-Cache 213) or from another SRB 212 entry as with a Load operation. The data part is updated in the transition DA 1215. AA 1206 performs steps 901, 902, and 903 of FIG. 9. As in a Load operation, the RC 1207 filter for a Store operation performs steps 904, 905, and 906 of FIG. 9. The QA 1208 filter performs steps 904, 905, and 906 of FIG. 9. Transition QA 1208 occurs when a Quadword arrives. The SC 1214 transition occurs when the Quadword is sent to D-cache 213 and the entry is purged. Transition SC 1214 transitions to the Store Completed Quadword valid state 1213. The transition DA 1215 (data arrives) causes a transition from the Unresolved data invalid 1201 to Unresolved data valid 1209, Address resolved data invalid 1202 to Address resolved data valid 1210, Request Issued data invalid 1203 to Request Issued data valid 1211 and Base valid data invalid 1204 to Base valid data valid 1212.

The following discusses additional functionality of the SRB according to embodiments of the present invention. Operations:

Addresses to Loads and Stores may not be resolved in order. Hence renaming is difficult to implement. However, the effect of renaming is aimed for, in the sense that, even if the operations are done out-of-order, the results are identical to those that would have been obtained if the operations were done in order.

Windows: There are Three Windows Defined Within the SRB.

1. Active window: The window of instructions bounded by the OUT and IN pointers as described above.

2. Load match window (LMW): For a given real address, this is the window of instructions bounded by the OUT pointer and a Load Pointer (LPTR).

For each Quadword that is returned one would like to know which entry or entries should be updated. A possible action could be to update all Load entries that have the same address as the Quadword being returned. However, this may not work correctly in all cases. The first case where such an action fails occurs when there is a Store to the same Quadword before the Load. The second case where such an action fails is when there is a Store with an unresolved address. In the second case, a guard should be implemented against the possibility that when the Store gets resolved its address becomes identical to the Load address. Thus, one should not inspect any entries after such a Store to look for a match. The LPTR is a pointer to the entry following the earliest Store entry that is either unresolved or that matches the address. If no such entry exists, the LPTR is identical to the IN pointer.

3. Update Match Window (UMW): For a given real address and a given IID, it is the window bounded by two pointers, the Update Window Start Pointer (USPTR) and the Update Window Entry Pointer (UEPTR). The UMW refers to the possible entries within the SRB 212 from where a current Load at a given entry may be satisfied without having to access D-cache 213. This UMW typically starts at the OUT pointer and terminates at the current Load entry itself. If there is a valid entry anywhere within this UMW, it may be copied over. However, if there is a Store to the same location before this entry then one may not copy the value from any earlier entry. Hence the UMW becomes smaller, and the UEPTR moves to the Store pointer. The other interesting thing is that it is possible, because entries are satisfied out-of-order, that a later entry may already have fetched this value. In this case, one may copy over this value without accessing the D-cache 213. Any such later location is valid as long as another Store to the same location is not encountered. Hence one may move the UEPTR to the next Store that has the same real address. The USPTR points to the closest earlier Store entry that has the same real address. If none exists, it is identical to the OUT pointer. The UEPTR is the closest later Store entry that has the same real address. If none exists, it is identical to the IN pointer. In each of the cases, the window includes the entry pointed to by the starting pointer, but is terminated by and does not include the entry pointed to by the ending pointer.

A Store entry has several states governed by two mechanisms, the first of which supplies the actual data for the Store, the second which supplies the address and the base Quadword at that address. A Load entry has five possible states: unresolved, resolved, issued, valid, completed. The completed state indicates that the valid Quadword has been sent through the aligner back to the IWB 204 (instruction buffer). Thus Table 1 below shows the possible states:

TABLE 1

| Data valid | Addr valid | Issued | Base valid | Name |
|---|---|---|---|---|
| 0 | 0 | — | — | Data_Invalid/Unresolved |
| 0 | 1 | 0 | — | Data_Invalid/Resolved |
| 0 | 1 | 1 | 0 | Data_Invalid/Issued |
| 0 | 1 | 1 | 1 | Base_Valid |
| 1 | 0 | — | — | Data_Valid/Unresolved |
| 1 | 1 | 0 | — | Data_Valid/Resolved |
| 1 | 1 | 1 | 0 | Data_Valid/Issued |
| 1 | 1 | 1 | 1 | Completed |

Figure 8:
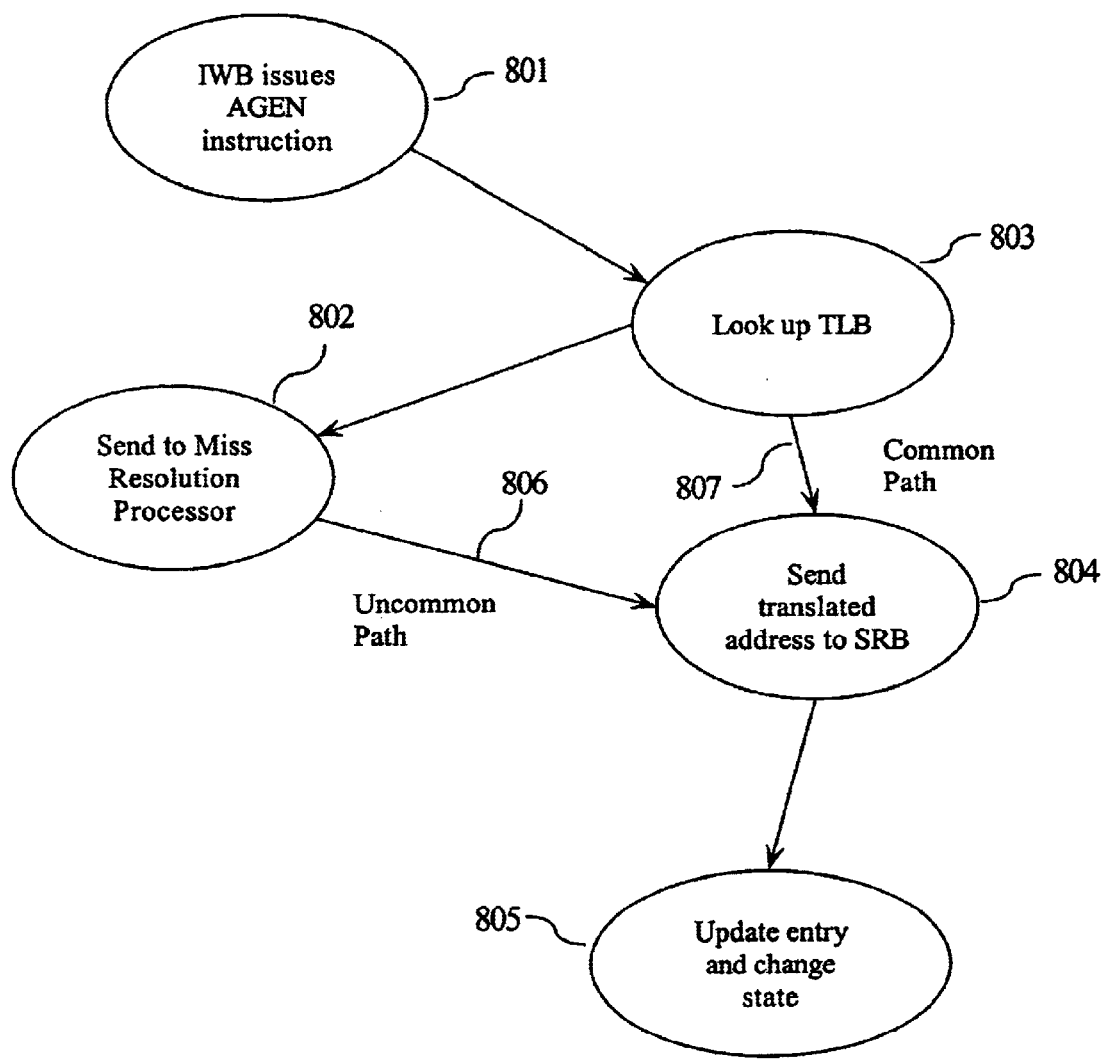
FIG. 8 is a flow diagram detailing a Store operation according to embodiments of the present invention.

FIG. 8 is a flow diagram of filling the real address field (e.g., 605). When the IWB 204 issues an AGEN request in step 801, the address is computed and sent through TLB 203 along with the Instruction ID (IID) 602 of the request and the length of the request (number of bytes) in step 803. If translation is successful, the real address of the enclosing Quadword, a mask and the IID are sent to the SRB 212 in step 804. Since this is a common occurrence it is shown as an common path 807. The matching entry in the active window of the SRB 212 is updated to reflect the real address for the entry and the status of the entry is changed to resolved in step 805. The mask is used to set the Operand Mask 606 in the entry.

If there is a miss in the TLB 203 in step 803, then a request is directly sent to the miss resolution processor (MRP), along with the IID in step 802. The MRP (not shown) returns the translated address along with the IID directly to the SRB 212. Since this is an uncommon occurrence it is shown as an uncommon path 806. As before, the matching entry in the SRB 212 gets updated in step 805, and its status is set to resolved. The mask identifying the portion of the Quadword of interest must also be transmitted through the MRP to the SRB 212.

When a Store operand becomes available, the IWB 204 issues an update packet to the SRB 212 along with the IID. The IID 602 is used for matching and the bytes corresponding to the Operand Mask 606 in the Quadword 607 are updated. The data valid part of the state is updated; the Store operation is deemed completed if the base is also valid at this point. In order to simplify the operation of merging the operand with the rest of the Quadword, the operand value must be rotated to its correct position in the Quadword before it is merged under the operand mask. Note that it is possible for both the base and the data to become valid at the same time. Rotating an operand is used when an instruction produces a result, say one byte and it needs to be inserted into the correct position in the Quadword corresponding to its address. For example, if the Quadword address is hex "2C30" and the byte address is "2C36", the byte needs to be moved over six positions before masking the result in the result for a Store operation. Assume the original Quadword (16 bytes), at "2C30", is hex "5A87369B2CF4914E - - -" (only 8 bytes shown) and the byte to be Stored into "2C36" is a hex "55" (replacing the hex "F4"). The-operations-performed are illustrated in the-following: The Quadword is logic ANDed with the hex Quadword "FFFFFFFFFF00FFFF - - -" and the logic ORed with the hex Quadword "0000000000550000" giving the resulting Quadword of hex "5A8739692C55914E - - -".

A Load or Store that is in a resolved state may issue a fetch request if all previous Store addresses are resolved and if none of the Stores are aliased. Fetch requests will be done in order, in the sense that among eligible Loads and Stores the one closest to the OUT pointer will be issued before the others.

Figure 7:
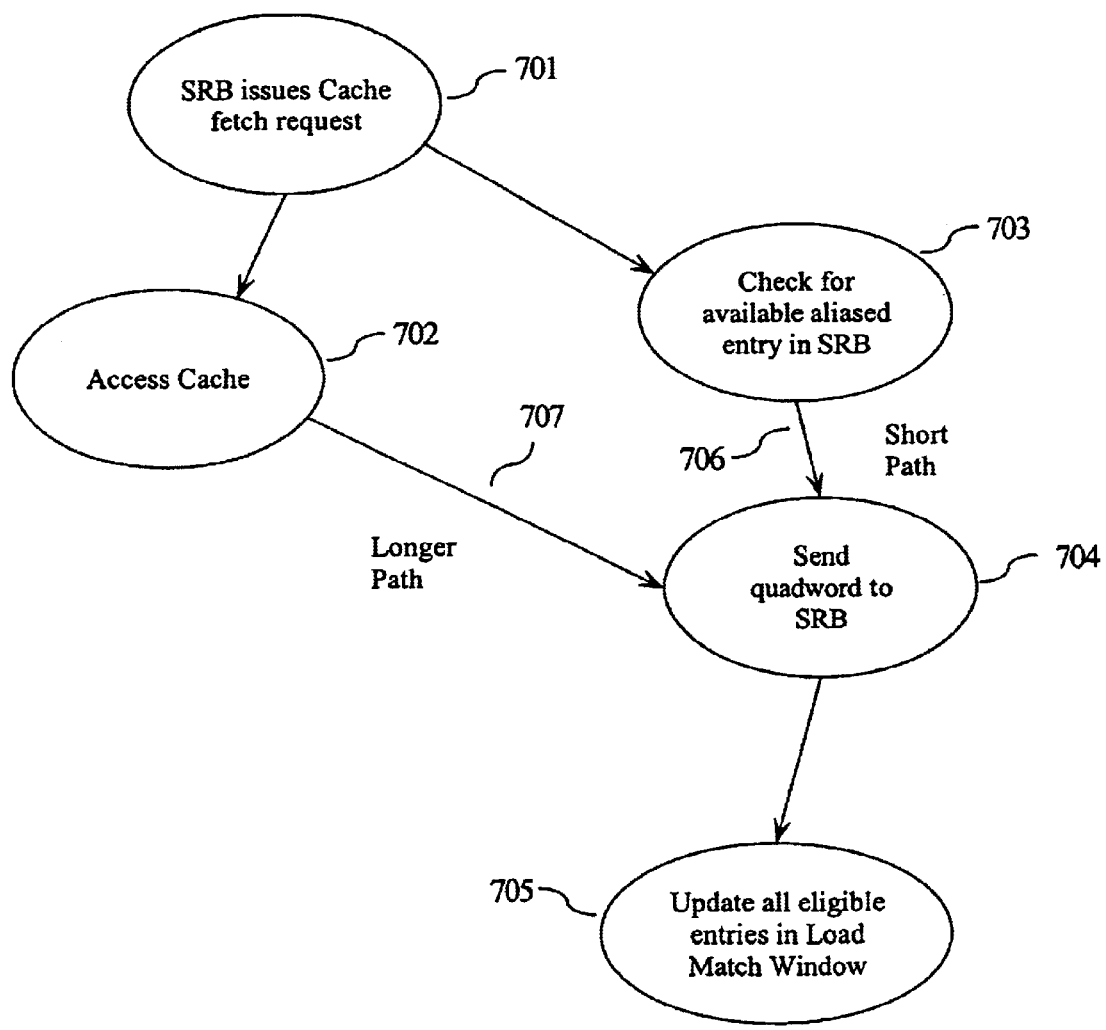
FIG. 7 is a flow diagram detailing a Load operation according to embodiments of the present invention.

FIG. 7 is a flow diagram for filling a Quadword field (e.g., 607). When a fetch request is issued by the SRB 212 in step 701, the Real Address 605 in the entry is sent to the D-cache 213 in step 702.. It simultaneously triggers a search in its UMW in step 703 for available data in the SRB 212. A match is indicated if there is an entry in the UPW that has the same address and that is in the data valid state if it is a Load, or a completed state if it is a Store. If there is a match in SRB 212, then the Quadword is sent to the SRB 212 via the short path 706. If there is no match in step 703, then the Quadword is sent to the SRB via the longer path 707. A "squash" of the cache Quadword is indicated if either there is a match or if an aliased Store is found with the Quadword data still invalid. The term "squash" is used to describe the following situation. Rather than first checking whether a Load may be satisfied from the SRB 212 and then going to the D-cache 213 if it cannot, both operations may be done simultaneously. Doing both operation simultaneously saves one or two machine cycles in the case the result needed is in the D-cache 213, however, the request from the cache is suppressed if the result may be satisfied locally. This act of suppression is referred to as "squashing".

In the case of a "squash", the cache request gets deleted. In the case of a match, the matching Quadword is copied into the entry triggering the fetch requests and its status is set to invalid if a Load, and base valid or completed if a Store. Simultaneously, other entries in the Load Match Window which are aliased to this address and are waiting a Quadword may also be updated in step 705. If the request is not squashed, the state is set to issued.

The cache request returns a Load packet consisting of a real address and a Quadword. A Load packet simply refers to what is returned by the D-cache 213 when a Load is issued. If the processor is awaiting the return of a request before sending out the next request, the returning address of the returning value is known. However, if an out-of-order implementation is used, the address returned first is not known unless cache tags the address along with the returning data. The combination of a Quadword returned along with the address is termed the "Load packet". The Real Address is used to update all matching entries in the Load Match Window (LMW). Each location in memory has a "virtual" and a "real address". The "virtual" address is the address where a program "thinks" a Quadword resides. However, because of virtual memory implementations, the physical location of this address may be somewhere else in memory or may not be in physical memory at all (i.e., may be on a disk). The mapping of the virtual address is done using a dynamic address translation mechanism. The location in physical memory of a Quadword is called the Quadword real address. The status of an updated entry is changed to valid if it is a Load or base valid or completed if it is a Store. Note that these two mechanisms together attempt to minimize accesses to the cache by eliminating duplicate accesses for the same Quadword.

A Load that is in a valid state must issue an IWB update request to transmit operand values to the IWB 204 before it can be completed. While it is not necessary for correctness, it is convenient to do these requests in order, in the sense that among eligible data-valid Loads the one closest to the OUT pointer is done first. An IWB update request triggers a rotate/sign extend operation on the Quadword before it is sent to the IWB 204 along with its IID . The entry is then set to the completed state and becomes ready for committing.

A Store is ready for committing if it is in the valid state. It is committed only if there is no cache miss. Such a cache miss is unlikely because Stores trigger fetch requests just like Loads. In order to make committing a Store an atomic operation, it may be necessary to prevent purging of lines that are slated for update. An atomic operation relates to an operation that is viewed as indivisible in the sense that the state of the machine must be predictably updated at the conclusion of the atomic operation. A Store of a word is one such operation. If the address of the Store is such that the word crosses a cache line boundary and hence part of it is at the end of one cache line and the rest on another cache line, then the system must ensure that both parts are updated in cache before proceeding to the next instruction. This type of operation is referred to as an "atomic operation".

The SRB 212 can function without pointers LPTR, USPTR, and UEPTR, however its performance would suffer because all operations would have to executed sequentially, one after another. The circular buffer organization of the SRB 212, hence the nature of indexing IN pointer 615 and OUT pointer 614, is necessary for ensuring that a programmer "sees" the memory operations as though they were performed in the sequence the programmer specified them. The SRB 212 is not a cache memory because a cache would remove items only if it needed space to bring in some other item. A cache does not retain data defining the strict order in-which entries are to be filled. A Store operation, with matching real addresses, always Stores into the SRB 212 before the cache since it is not known ahead of time if all operations ahead of the Store operation have been completed. Also, storing in the SRB 212 first ensures that results may be forwarded directly to Load operations that may need the results without having to go to memory.

Pipelines

The pipelines listed below are parallel services used in the SRB 212 according to embodiments of the present invention.

AGEN pipe: IWB issue, AGEN, Translate, SRB Address

Fetch pipe: SRB issue, Cache, Cache/LMW Setup, SRB Cache op

Load update pipe: SRB issue, Align, IWB Update

Store operand pipe: IWB Issue, Quad, SRB Store op

Fetch bypass: SRB issue, UMW Setup, SRB Bypass op

Long bypass: IWB issue, AGEN, Translate, Cache, Cache/Align, IWB Update

Ports

The ports are resources used to facilitate operation of the pipelines listed above according to embodiments of the present invention.

Cache: 2 read ports, 1 reLoad/write port

SRB: Issue filters: 2 fetches, 1 Store, 2 IWB write

SRB: Write ports: 2 cache/bypass Loads (4 to 2), 2 agents, 1 Store op

Special Cases

Sequential Load consistency:

The main concern here is that when the operations are allowed to go out-of-order, a later Load to a location may fetch from the cache before an earlier Load to the same location. If some other processor had written into this location in the meanwhile, the result would be wrong.

In embodiments of the present invention, the earlier Load would copy results from the later Load that was resolved earlier. Hence this problem is avoided.

Atomic Quadwords:

Embodiments of the present invention have Quadword granularity for entries in the SRB 212, and Quadword granularity for accesses to the cache. Hence, as long as a Quadword is aligned, updates occur at Quadword granularity.

Store Forwarding:

Loads are generally satisfied through cache accesses. However, if there is a pending Store to a location from which a Load is requested, the value from the cache may be incorrect. The usual way that this is taken care of is through a Store buffer which is checked for a possible value while the cache is being accessed.

In embodiments of the present invention, the SRB 212 functions also as a Store buffer. Hence the SRB 212 is checked to determine whether a more current Quadword exists for the location compared to the one that will be returned from the D-cache 213. Entries in the SRB 212 are not retired until the updated values can be safely read from the cache. Embodiments of the present invention go one step further by saving Quadwords fetched during Loads, thus allowing later Loads to the same location to get their values from the SRB 212 rather than from the D-cache 213.

Multiple Stores:

Another typical problem occurs when a Load is partially aliased with more than one Store. In embodiments of the present invention, a Quadword of a Load may be aliased with at most one Store. If there are two Stores that are aliased with the Load, the second Store modifies the complete Quadword as seen after the first Store. Hence the resulting Quadword after the second Store will have the cumulative effect of both Stores. This second Quadword is then forwarded to the aliased Load. The proposal works in a similar way when more than two Stores alias partially to a single Load.

Control Speculation:

All instructions are committed in order under the control of the IWB 204. Instructions may be speculatively executed, but the results are architecturally updated only during the process of committing. At any point, any number of the most recent instructions residing in the IWB 204 may be purged. Purging instructions from the IWB 204 causes instructions with the same IIDs in the SRB 212 to be purged. This allows all speculated instructions, including those resulting from branch prediction, or those that come after an exception-generating instruction, to be squashed without architectural effects.

Quadword Crossing Accesses:

If a Load crosses a Quadword, all instructions starting at this Load are flushed from the IWB 204 and SRB 212. The instruction is then broken up into 2 Loads, one for the part in the first Quadword, and one for the part in the second Quadword. These Loads have dummy registers as their target. A third instruction is added to merge the results of these two Loads into the original register target. A similar break-up can be performed for a Quadword-crossing Store.

This solution assumes that Quadword crossing is an uncommon phenomenon because considerable penalty is incurred in the process of flushing instructions, reformatting the Load and refetching the remaining instructions. The penalty can be reduced somewhat if three slots-were allocated for each Load and Store, with two of them remaining unused unless a Quadword crossing Load or Store is encountered. Quadword crossing occurs when the granularity of an access from the D-Cache 213 is one Quadword and a full word operand, which is located at one of the last three bytes of the Quadword, requires that two Quadwords be fetched. However this reduces the effective size of the IWB 204 and SRB 212 because two out of three slots will remain unused most of the time. An alternative scheme is to allow the processor to enter a mode in which all references assume the worst case, with the normal situation prevailing when the processor exits this mode. Such a mode could be entered, for example, when a certain number of Quadword crossings are encountered in a predefined length of time. It may also be triggered by the code entering some region (in the instruction address space) where a Quadword crossing has previously been encountered.

Address Speculation:

Embodiments of the present invention do not allow Loads to fetch as soon as its address is resolved if there is a pending Store whose address is not resolved. It is not clear whether this causes a performance degradation in cases where the addresses are not aliased. If there is measurable benefit in letting Loads get ahead and if aliasing problems are uncommon, the following modification may be made to the proposed scheme. Aliasing refers to the phenomenon of two addresses being identical though it is not necessarily obvious from the instruction that they will be identical. In typical computers, the address is provided by the addition of values in two registers. Thus the sum can be the same even if the individual values are different. Another way addresses get "aliased" is through address translation where two addresses map to the same real address.

Prior to committing a Store a check is made to ensure that all Loads, aliased to the Store up to the next Store, have been Loaded with the correct value. If any of the values are found to be incorrect, the IWB 204 and SRB 212 are purged starting at the incorrectly Loaded instruction and the instructions are refetched and re-executed. A history of such incorrect speculations may be used to prevent repeated occurrences of this situation. Alternatively, the processor can enter a mode where Load speculations are not permitted. During the mode where Load speculations are permitted, Loads may issue fetch requests as soon as they enter the resolved state. It does not appear to be worthwhile speculating on Stores; the fetch for these should probably be done in order.

Some processor architectures take a more conservative approach where Loads are allowed to proceed out-of-order. When the address for a Store is resolved, if it is found to be aliased to any following operation, all instructions after the Store are purged and refetched.

A third possibility is to tag all Loads that have been processed speculatively. When a Store is committed, its address is checked against all moved Loads. If there is a match, instructions are purged starting at the first matched Load (this may be a bit conservative because the Store currently being committed may not have been the one over which the Load was moved).

Simultaneous Multithreading:

Simultaneous multithreading refers to the ability of a processor to execute two prediction schemes to determine (guess) at the value of the result of an operation, to take an action assuming the correctness of the guess, and to be able to back out correctly if the guess ultimately was incorrect. Simultaneous multithreading helps to reduce the perceived latency of operations, especially Load operations.

The modifications needed for the SRB 212 to support simultaneous multithreading (SMT) are minimal. Since each entry addresses a real location, it is not even necessary to tag an entry in the SRB 212 identifying the thread it belongs to. The effect of a change in a memory location by one thread is therefore immediately available to the other active thread.

Value Prediction:

Embodiments of the present invention may be modified for value prediction. The most benefit achievable from value prediction is likely to come from the prediction of Load values in the IWB 204, rather than the prediction of Load addresses. This is because the prediction of Load values helps to eliminate the latency of memory references, whereas prediction of Load addresses does not. However, predicted Load values could end up generating addresses for Loads and Stores that are speculative, and therefore also memory references that are speculative.

We assume the following mechanism in the IWB 204 to support value prediction. An additional field is maintained for each entry to Store the predicted target for the instruction. This field may be filled by looking up a prediction table either in the decode state, or when the entry gets created in the IWB 204. Sources of later instructions that are dependent on this target may choose to fill their source fields using the predicted target. While it may be useful to tag such instructions as having speculative sources, it is not necessary.

When an instruction is executed the value is Stored as usual in the target field of the instruction and all the dependent source fields. However, in the latter case, a comparison is made between the value to be Stored and the existing value, if any. If there is a mismatch, it will be because of a wrongly predicted value. The existence of a mismatch in any of the sources changes the state of the instruction to ready, if the instruction is issued or completed. Thus the ready state signifies that the instruction has all sources available and is ready for either first issue or for reissue.

An instruction at the OUT pointer location that has completed is ready for committing because it does not have any invalid speculative sources. It can be proved that this scheme converges, in the sense that instructions may be reissued several times, but will eventually complete. However, there are ways to optimize the scheme to restrict the number of reissues; these will not be discussed here.

In the SRB 212, an address field may be overwritten because of changes in the IWB 204. If the entry that is changed is a Load, it is sufficient to reset the state of the entry back to resolved, even if it has been issued or completed. Updates can be minimized by resetting the state only if there is a mismatch between the existing value in the field and the new value. This will trigger a fetch request and a parallel search for an aliased Store as before. Stores pose an additional problem. Since the old Store value could have already been used to update later aliased Loads and Stores, it is necessary to invalidate all later updates to locations aliased to the old as well as the new addresses.

An operand field may also be rewritten multiple times. If the value written is different from the present value for a completed Load instruction, the state of the entry reverts back to valid. If a completed Store instruction gets overwritten with a new entry, all later instructions aliased to this location must also be overwritten with the new entry. This is done by triggering a dummy Load to this location using the IID of the updated Store.

Other methods using discrete and distributed control structures have been created and used, but these present significant wiring and cycle times issues. A straightforward way to incorporate these modifications is to provide two additional, one to invalidate in the event of a Store address update, and another to trigger a dummy Load in the event of a Store operand update monolithic custom structure such as the SRB 212 sweeps these into a single entity and uses dataflow principles to simplify the overall required functionality. The relatively simpler structure associated with the SRB 212 employing embodiments of the present invention reduce complexity and achieve higher frequency.

Figure 13:
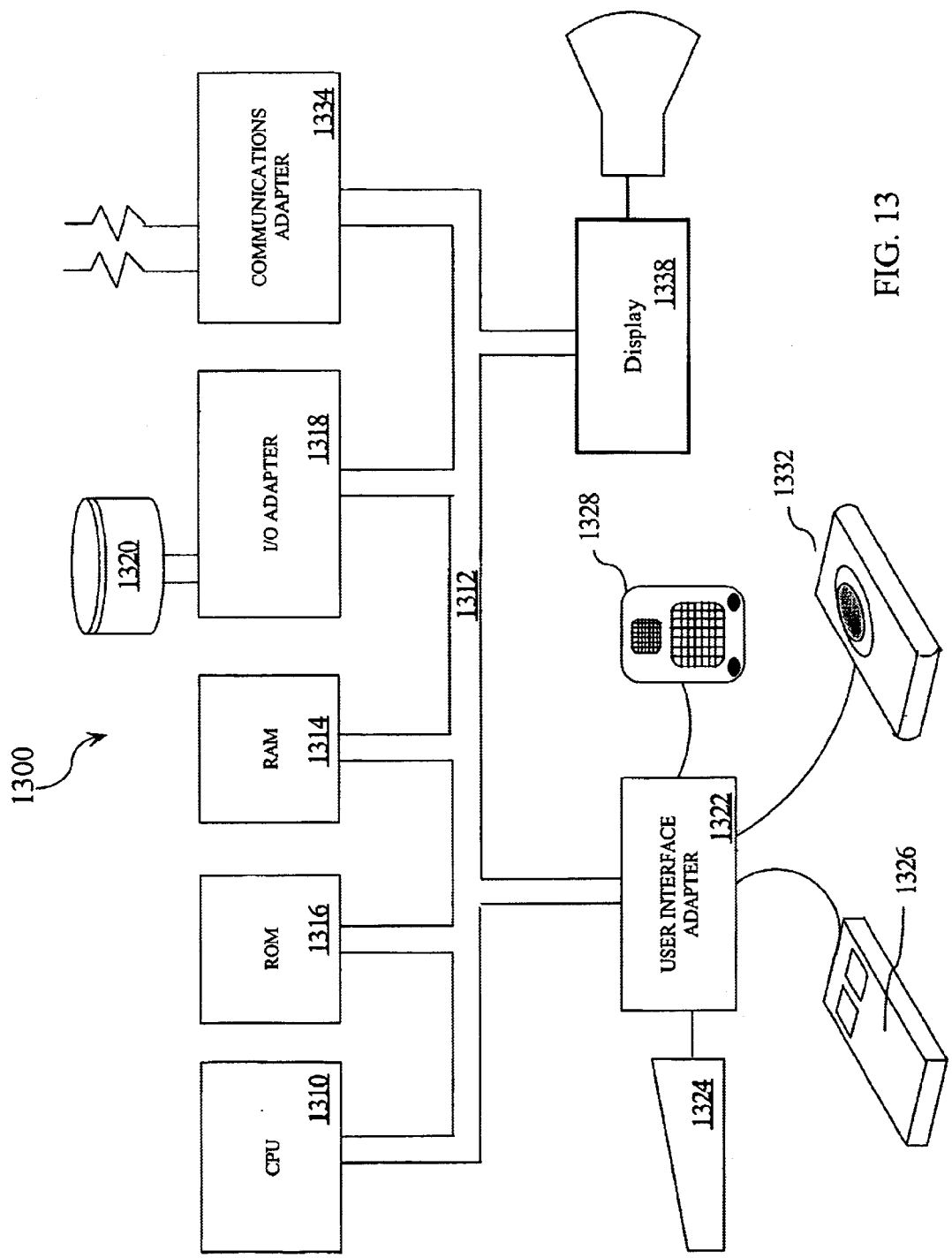
FIG. 13 is a block diagram of a data processing system which contains a CPU with a processor that may use an apparatus for managing processor operations according to embodiments of the present invention.

Referring to FIG. 13, an example is shown of a data processing system 1300 which may be used for the invention. The system has a central processing unit (CPU) 1310, which is coupled to various other components by system bus 1312. Read-only memory ("ROM") 1316 is coupled to the system bus 1312 and includes a basic input/output system ("BIOS") that controls certain basic functions of the data processing system 1300. Random access memory ("RAM") 1314, I/O adapter 1318, and communications adapter 1334 are also coupled to the system bus 1312. I/O adapter 1318 may be a small computer system interface ("SCSI") adapter that communicates with a disk storage device 1320. Communications adapter 1334 interconnects bus 1312 with an outside network enabling the data processing system to communicate with other such systems. Input/Output devices are also connected to system bus 1312 via user interface adapter 1322. Keyboard 1324, track ball 1332, mouse 1326 and speaker 1328 are all interconnected to bus 1312 via user interface adapter 1322. In this manner, a user is capable of inputting to the system through the keyboard 1324, trackball 1332 or mouse 1326 and receiving output from the system via speaker 1328 and display 1338. CPU 1310 in data processing system 1300 may employ a processor to manage Load and Stores using a SRB 212 operating according to embodiments of the present invention.

Figure 14:
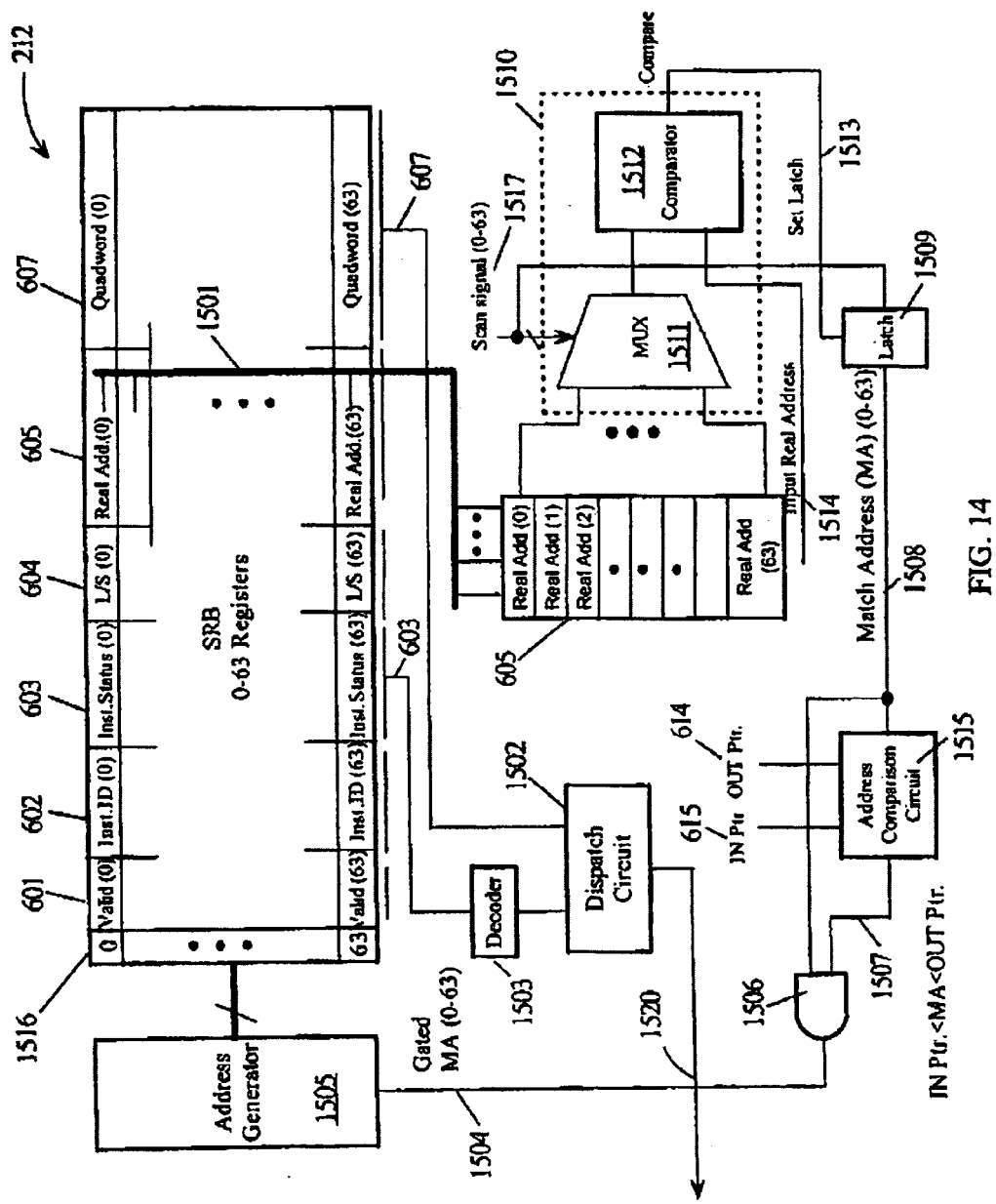

FIG. 14 is a block diagram of circuit elements described relative to FIGS. 1–13 and in particular to FIGS. 1–6. SRB 212 comprises a plurality of registers (in this case 64 registers). The registers are partitioned into a plurality of data entry fields: Valid bits 601, Instruction ID 602, Instruction Status 603, Load/Store 604, Real Address 605, and Quadword 607. Since there are 64 registers in SRB 212 there are 64 data entries in each data entry field (e.g., Real Address (0)–Real Address (63)). Address Generator generates the addresses 1516 used to access SRB 212. Data entries corresponding to register addresses (0–63) may be updated (add data) or removed (deleted). Registers of the SRB 212, according to embodiments of the present invention, are addressed by the use of pointers. Pointers contain the addresses of the registers in the SRB 212. Particular pointers, for example, the IN pointer 615 and the OUT pointer 614, are loaded with particular register addresses which are indexed under certain conditions. The IN pointer 615 points to the register where a register entry is next added and OUT pointer 614 points to the register where a register entry is next retired or removed.

Operations of the SRB are performed by special circuitry called filters. Filters, according to embodiments of the present invention, are uniquely associated with each service (operations that are performed on data entry fields). All filters operate in parallel, checking to determine whether there is any entry that needs the particular service of the filter, selecting the earliest entry if there are several, and dispatching that entry to the hardware that performs the service. The filters also perform the operation of "scanning" the entry fields of the SRB 212. Scanning may be done with a multiplexer or other circuit that allows a predetermined input value (e.g., a real address) to be compared to a value in like data entry fields (e.g., Real Address fields 605) in the SRB 212 registers to determine a match. On a match, the address of the register containing the matching value is compared to the register addresses bounded by register address pointers (e.g., IN pointer 615 and OUT pointer 614). Operations may be performed on data entry fields of a register corresponding to a matching value as a result of scanning based on a decode of other data entry fields (e.g., Instruction Status field 605).

FIG. 14 illustrates circuitry employed in a filter. For example, Real Addresses 605 are coupled in parallel to multiplexer (MUX) 1511. A scan signal 1517 produces each Real Address (0–63) stored in data entry field 605 as a sequential output of MUX 1511. To determine if a particular Real Address 1514 is in SRB 212, comparator 1512 compares input Real Address 1514 to the scanned Real Addresses 605. In this example, MUX 1511 decodes addresses (0–63) to produce the required signals internal to MUX 1511 that sequentially selects the stored Real Addresses (0–63). If comparator 1512 determines the input Real Address 1514 matches with a stored Real Address 605, then a compare signal 1513 is generated that latches the scan signal value (register address corresponding to the compare 1513) into latch 1509 which is outputted as Match Address 1508. Match Address 1508 is the register address (0–63) which has the Real Address 605 that matches the input Real Address 1514. An address comparison circuit compares MA 1508 with IN Pointer (Ptr.) 615 (address) and the OUT Ptr. 614 (address) to determine if MA 1508 indicates that the register corresponding to MA 1508 is in a register whose address lies between IN Ptr. 615 and OUT Ptr. 614. Entries in registers between IN Ptr. 615 and OUT Ptr. 614 have valid entries as indicated by Valid bit 601.

If a Real Address 605 matches input Real Address 1514 and it is in a register located between TN Ptr. 615 and OUT Ptr. 614, then MA 1508 is outputted as gated MA 1504 to Address Generator 1505 which outputs the data entry fields of the register with the address corresponding to MA 1504. In this example, the Quadword 607 in the register (0–63) of SRB 212 corresponding to MA 1504 is dispatched to an operation unit (e.g., IMU 102) in response to a decode of data in the Instruction Status 603 entry by decoder 1503. Other operations may be done on data entry fields (e.g., 601–605) of a register corresponding to a matching values as a result of scanning based on a decode of other data entry fields. Since the operations to be performed on data in each of the SRB registers is contained within the fields of the registers, the SRB has a "data flow" architecture. More detailed operations of the SRB are explained relative to the state diagrams of FIGS. 7–12. FIG. 14 only shows scanning being implemented on the Real Address 605 data entry field. It is understood that any of the particular data entry fields shown in FIG. 14 or other data entry fields not shown in this example of FIG. 14 may employ the data flow architecture with filters operating in parallel to scan the data entry fields.

Although the present invention and its advantages have been described in detail, it should be understood that various changes, substitutions and alterations can be made herein without departing from the spirit and scope of the invention as defined by the appended claims.

What is claimed is:

1. An apparatus for managing operations in a processor, said apparatus comprising:
    a plurality of addressable registers, each of said registers partitioned into plurality of data entry fields;
    a first comparison circuit operable to scan a like data entry field of said plurality of addressable registers and compare data in said like data entry fields to predetermined input data;
    a second comparison circuit operable to compare a first register address of a first register in said plurality of addressable registers to a second register address of a second register in said plurality of addressable registers, wherein said first register address corresponds to a first register that has said data in said like data entry field that matches said predetermined input data; and
    a dispatch circuit operable to dispatch data of a second data entry field of said second register to an operation unit in response to a decode of data in a third data entry field of said second register when said second comparison circuit indicates said second register address matches said first register address.

2. The apparatus of claim 1, wherein said operations are Load and Store operations within said processor.

3. The apparatus of claim 2, wherein said operation unit comprises a Storage Management Unit (SMU) said SMU comprising data cache memory and controller and a Storage Reference Buffer (SRB).

4. The apparatus of claim 3 wherein said addressable registers are configured as said Storage Reference Buffer (SRB).

5. The apparatus of claim 4, wherein said data entry fields, added to said SRB after a mis-predicted branch instruction occurs in said processor, are retired and said first pointer is indexed to first register address of a register with added register data entry bits which were added immediately prior to said mis-predicted branch instruction.

6. The apparatus of claim 3, wherein the SRB comprises the plurality of addressable registers.

7. The apparatus of claim 6, wherein a Load operation in one of the Load and Store operations comprises:
   issuing concurrently a fetch instruction requesting a real address to a data cache and the Storage Reference Buffer (SRB), the real address corresponding to an address of multiple bytes of data;
   scanning the addressable registers in the SRB for the real address;
   receiving the multiple bytes of data from the SRB if the real address is available;
   retrieving the multiple bytes of data first from the SRB if the real address is available and second from the data cache if the real address is not available in the SRB; and
   updating a corresponding one of the addressable registers with the multiple bytes of data.

8. The apparatus of claim 6, wherein a Store operation in one of the Load and Store operations comprises:
   issuing a real address generation instruction;
   looking up the real address in a table lookup buffer;
   sending the real address to a miss resolution processor if the real address is not in the table lookup buffer, the miss resolution processor determining a translated real address;
   sending the real address from one of the miss resolution processors and the table lookup buffer to the SRB; and
   updating corresponding data entry fields in one of the addressable registers in the SRB.

9. The apparatus of claim 6, wherein a Store operation in one of the Load and Store operations comprises:
   issuing an address generation instruction by a first instruction unit generating a real address in memory;
   updating the real address in a real address field of one of the addressable registers in the SRB;
   sending concurrently, a request for a multiple byte word with the real address to the SRB and a data cache;
   receiving the multiple byte word from one of the addressable registers in the Storage Reference Buffer and from a data cache;
   updating the multiple byte word from the data cache with an operand mask;
   receiving from the first instruction unit store data operand;
   aligning the store data operand to the multiple bytes of data; and
   updating the multiple bytes of data with a complement of the operand mask.

10. The apparatus of claim 6, wherein a Load operation in one of the Load and Store operations comprises:
    issuing an address generation instruction by a first instruction unit generating a real address in a memory;
    updating the real address in a real address field of one of the addressable registers in the SRB;
    sending concurrently, a request for a multiple byte word with the real address to the SRB and a data cache;
    receiving the multiple byte word from one of the addressable registers in the SRB and the data cache;
    extracting selected bytes from the multiple byte word;
    receiving the selected bytes by the first instruction unit; and
    updating the multiple bytes of data with a complement of the operand mask.

11. The apparatus of claim 1, wherein said predetermined input data is a real address requesting particular data corresponding to one of a Load and a Store operation.

12. The apparatus of claim 1, wherein said first comparison circuit comprises multiple like entry comparison circuits, each of said multiple like entry comparison circuits operable concurrently in parallel.

13. The apparatus of claim 1, wherein said operation unit comprises an Instruction Management Unit (IMU).

14. The apparatus of claim 1, wherein one of said data entry fields is a Valid bit field, said Valid bit field indicating whether other data entry fields are valid.

15. The apparatus of claim 1, wherein one of said data entry fields is an Instruction Identification (ID) field corresponding to a particular Load and Store operation.

16. The apparatus of claim 1, wherein one of said data entry fields is an Instruction status field corresponding to a status of one of said Load and Store operations.

17. The apparatus of claim 1, wherein one of said data entry fields is a Load/Store field having a Load/Store bit, said Load/Store bit corresponding to a Load operation if said Load/Store bit has a first logic state and corresponding to a Store operation if said Load/Store bit has a second logic state.

18. The apparatus of claim of claim 1, wherein one of said data entry fields comprises Real Address field, said Real Address field corresponding to a particular Real Address of memory data.

19. The apparatus of claim 1, wherein one of said data entry fields is a Quadword field, said Quadword field comprising multiple bytes of data.

20. The apparatus of claim 1, wherein one of said data entry fields is an Operand Mask field, said Operand Mask field defining selected bytes of data within a selected one of said data entry fields.

21. The apparatus of claim 1, wherein said operation unit is a pipeline execution unit operating concurrently on a plurality of said data entry fields.

22. The apparatus of claim 1, wherein said addressable registers are addressed using a plurality of address pointers.

23. The apparatus of claim 22, wherein one of said address pointers is a third pointer, said third pointer, said third pointer pointing to one of said addressable registers whose data entry fields contain data defining an earliest Store operation that is either unresolved or that matches a register address of a current Load operation.

24. The apparatus of claim 22, wherein said address pointers comprise a fourth and a fifth pointer, said fourth and fifth pointers defining a window of register addresses from which a Load operation may be satisfied without having to access other memory storage.

25. The apparatus of claim 22, wherein said second register address is selected from registers addresses which fall within a window of register addresses, said window of addresses defined by said address pointers.

26. The apparatus of claim 25, wherein said window of register addresses defines active Load and Store operations.

27. The apparatus of claim 22, wherein one of said address pointers is a first pointer, said first pointer pointing to an IN register address of a first available register into which data may be added.

28. The apparatus of claim 27, wherein said first pointer is indexed by one when said register data has been added, said first pointer having a minimum and a maximum value wherein a decrement down from a minimum value results in said maximum value and an increment up from said maximum value results in said minimum value.

29. The apparatus of claim 22, wherein one of said address pointers is a second pointer, said second pointer pointing to an OUT register address of a first available register from which register data may be retired.

30. The apparatus of claim 29, wherein said second pointer is indexed by one when register entry bits have been deleted, said second pointer having a minimum and a maximum value wherein a decrement down from said minimum value results in said maximum value and an increment up from said maximum value results in said minimum value.

31. A data processing system, comprising:
a central processing unit (CPU);
random access memory (RAM);
read only memory (ROM);
an I/O adapter; and
a bus system coupling devices internal to said CPU, said CPU comprising an apparatus for managing operations within a processor of said CPU, said apparatus comprising:
a first comparison circuit operable to scan a like data entry field of said plurality of addressable registers and compare data in said like data entry fields to predetermined input data;
a second comparison circuit operable to compare a first register address of a first register in said plurality of addressable registers; to a second register address of a second register in said plurality of addressable registers, wherein said first register address corresponds to a first register that has said data in said like data entry field that matches said predetermined input data; and
a dispatch circuit operable to dispatch data of a second data entry field of said second register to an operation unit in response to a decode of data in a third data entry field of said second register when said second comparison circuit indicates said second register address matches said first register address.

32. The data processing system of claim 31, wherein said operations are Load and Store operations within said processor.

33. The data processing system of claim 32, wherein said operation unit comprises a Storage Management Unit (SMU) said SMU comprising data cache memory and controller and a Storage Reference Buffer (SRB).

34. The data processing system of claim 33 wherein said addressable registers are configured as said Storage Reference Buffer (SRB).

35. The data processing system of claim 34, wherein said data entry fields, added to said SRB after a mis-predicted branch instruction occurs in said processor, are retired and said first painter is indexed to first register address of a register with added register data entry bits which were added immediately prior to said mis-predicted branch instruction.

36. The data processing system of claim 31, wherein said predetermined input data is a real address requesting particular data corresponding to one of a Load and a Store operation.

37. The data processing system of claim 31, wherein said first comparison circuit comprises multiple like entry comparison circuits, each of said multiple like entry comparison circuits operable concurrently in parallel.

38. The data processing system of claim 31, wherein said operation unit comprises an Instruction Management Unit (IMU).

39. The data processing system of claim 31, wherein one of said data entry fields is a Valid bit field, said Valid bit field indicating whether other data entry fields are valid.

40. The data processing system of claim 31, wherein one of said data entry fields is an Instruction Identification (ID) field corresponding to a particular Load and Store operation.

41. The data processing system of claim 31, wherein one of said data entry fields is an Instruction status field corresponding to a status of one of said Load and Store operations.

42. The data processing system of claim 31, wherein one of said data entry fields is a Load/Store field having a Load/Store bit, said Load/Store bit corresponding to a Load operation if said Load/Store bit has a first logic state and corresponding to a Store operation if said Load/Store bit has a second logic state.

43. The data processing system of claim of claim 31, wherein one of said data entry fields comprises Real Address field, said Real Address field corresponding to a particular Real Address of memory data.

44. The data processing system of claim 31, wherein one of said data entry fields is a Quadword field, said Quadword field comprising multiple bytes of data.

45. The data processing system of claim 31, wherein one of said data entry fields is an Operand Mask field, said Operand Mask field defining selected bytes of data within a selected one of said data entry fields.

46. The data processing system of claim 31, wherein said operation unit is a pipeline execution unit operating concurrently on a plurality of said data entry fields.

47. The data processing system of claim 31, wherein said addressable registers are addressed using a plurality of address pointers.

48. The data processing system of claim 47, wherein one of said address pointers is a third pointer, said third pointer, said third pointer pointing to one of said addressable registers whose data entry fields contain data defining an earliest Store operation that is either unresolved or that matches a register address of a current Load operation.

49. The data processing system of claim 47, wherein said address painters comprise a fourth and a fifth pointer, said fourth and fifth pointers defining a window of register addresses from which a Load operation may be satisfied without having to access other memory storage.

50. The data processing system of claim 47, wherein said second register address is selected from registers addresses which fall within a window of register addresses, said window of addresses defined by said address pointers.

51. The data processing system of claim 37, wherein said window of register addresses defines active Load and Store operations.

52. The data processing system of claim 47, wherein one of said address pointers is a first pointer, said first pointer pointing to an IN register address of a first available register into which data may be added.

53. The data processing system of claim 52, wherein said first pointer is indexed by one when said register data has been added, said first pointer having a minimum and a maximum value wherein a decrement down from a minimum value results in said maximum value and an increment up from said maximum value results in said minimum valve.

54. The data processing system of claim 47, wherein one of said address pointers is a second pointer, said second painter pointing to an OUT register address of a first available register from which register data may be retired.

55. The data processing system of claim 54, wherein said second pointer is indexed by one when register entry bits have been deleted, said second pointer having a minimum and a maximum value wherein a decrement down from said minimum value results in said maximum value and an increment up from said maximum value results in said minimum value.

* * * * *

UNITED STATES PATENT AND TRADEMARK OFFICE
CERTIFICATE OF CORRECTION

| | |
|---|---|
| PATENT NO. | : 6,938,148 B2 |
| APPLICATION NO. | : 09/737342 |
| DATED | : August 30, 2005 |
| INVENTOR(S) | : Charles Roberts Moore, Ravi Nair and Wolfram M. Sauer |

It is certified that error appears in the above-identified patent and that said Letters Patent is hereby corrected as shown below:

Column 20,
Line 43, replace "37" with -- 50 --.
Line 54, replace "valve" with -- value --.

Signed and Sealed this

Twentieth Day of June, 2006

JON W. DUDAS
*Director of the United States Patent and Trademark Office*